US012600290B2

(12) United States Patent
Massa

(10) Patent No.: US 12,600,290 B2
(45) Date of Patent: Apr. 14, 2026

(54) VEHICLE MODULAR ACCESSORY MOUNTING SYSTEM

(71) Applicant: HiViz Lighting, Inc., Hendersonville, NC (US)

(72) Inventor: Samuel T. Massa, Hendersonville, NC (US)

(73) Assignee: HiViz Lighting, Inc., Hendersonville, NC (US)

( * ) Notice: Subject to any disclaimer, the term of this patent is extended or adjusted under 35 U.S.C. 154(b) by 231 days.

(21) Appl. No.: 18/484,225

(22) Filed: Oct. 10, 2023

(65) Prior Publication Data

US 2024/0034220 A1 Feb. 1, 2024

Related U.S. Application Data

(63) Continuation of application No. 16/873,672, filed on Nov. 9, 2020, now Pat. No. 11,820,281.

(60) Provisional application No. 62/932,770, filed on Nov. 8, 2019.

(51) Int. Cl.
| | |
|---|---|
| *B60Q 1/00* | (2006.01) |
| *B60Q 1/04* | (2006.01) |
| *B60Q 1/24* | (2006.01) |

(52) U.S. Cl.
CPC ............. *B60Q 1/0041* (2013.01); *B60Q 1/00* (2013.01); *B60Q 1/0035* (2013.01); *B60Q 1/0483* (2013.01); *B60Q 1/247* (2022.05)

(58) Field of Classification Search
CPC ........................... B60Q 1/0483; B60Q 1/2657
See application file for complete search history.

(56) References Cited

U.S. PATENT DOCUMENTS

| | | | | |
|---|---|---|---|---|
| 3,677,451 | A * | 7/1972 | Burland | ................... B60R 9/048 224/330 |
| 6,299,336 | B1 * | 10/2001 | Hulse | ................... B60Q 1/2657 362/198 |
| 7,303,320 | B1 * | 12/2007 | Ashley | ................... B60Q 3/30 362/497 |
| 7,989,979 | B2 * | 8/2011 | Burgess | ................... B60Q 1/245 307/112 |
| 9,782,613 | B1 * | 10/2017 | Lenz, Jr. | ................... B60Q 1/302 |
| 2013/0208494 | A1 * | 8/2013 | Jones | ................... B60Q 1/2611 362/523 |
| 2017/0254106 | A1 * | 9/2017 | Bruinsma | ................... F21V 21/22 |
| 2020/0406812 | A1 * | 12/2020 | Molines | ................... H05B 47/18 |
| 2021/0010654 | A1 | 1/2021 | Ko | |
| 2021/0010667 | A1 | 1/2021 | Ko | |

* cited by examiner

*Primary Examiner* — Eric T Eide
(74) *Attorney, Agent, or Firm* — CHRISTENSEN O'CONNOR JOHNSON KINDNESS PLLC

(57) ABSTRACT

A modular vehicle accessory mounting system which includes one or more extruded rails designed to attach along a edge of the installation vehicle, one or more modular accessory modules that attach to the extruded rail as well as one or more communication modules that provide power to the accessory modules and serves as a communication bridge between the system and the vehicle or outside world. Generally speaking, these components may be structured to provide a low-profile mounting system for auxiliary illumination and other accessories along the edges of vehicles.

20 Claims, 43 Drawing Sheets

[ A ]

[ B ]

Module Addresses
54-60
(Channel
206-230)

Module Addresses 36-53
(Channel 138-205)

Module Addresses 61-77
(Channel 206-274)

Module Addresses 18-35
(Channel 69-137)

Module Addresses 78-95
(Channel 275-343)

Module Addresses 1-17
(Channel 1-68)

Module Addresses 96-113
(Channel 344-412)

Module
Addresses
114-131
(Channel
413-481)

VEHICLE MODULAR ACCESSORY MOUNTING SYSTEM

RELATED APPLICATIONS

This application is a continuation of U.S. application Ser. No. 16/873,672, filed Nov. 9, 2020, which claims the benefit of Provisional Application No. 62/932,770, filed Nov. 8, 2019, each of which is specifically incorporated herein by reference in its entirety.

JOINT RESEARCH AGREEMENT

This invention was developed as part of a Joint Research Agreement between: HiViz LED Lighting, LLC, USA, Vision Motor Sports, Inc., USA and Vision X Asia, Korea.

TECHNICAL FIELD

This disclosure generally pertains to the field of vehicle modular accessory mounting systems. More particularly, the invention pertains to vehicle modular accessory mounting systems supporting multiple types of modules, including but not limited to, LED based lighting modules.

BACKGROUND

Existing vehicle auxiliary illumination products and other vehicle accessories are typically installed using sheet metal brackets, aluminum castings or angle aluminum, and fail to meet the needs of the industry due to compromises in the installation location, reduced strength of installation supports, few if any post-installation upgradable components and limited functionality that require multiple systems to be installed to meet both illumination and traffic signaling needs. Other products attempt to deliver low-cost illumination systems by building many LEDs into a single unit with a single controller, but these solutions are similarly unable to meet the needs of the industry due to lack of flexibility and serviceability in that a failure of a single component would require replacement of the entire system and downtime for a valuable service vehicle.

Still, other solutions can only address the present illumination needs with fixed system features so, for example, upgrading to support a new wireless standard, or adding a camera or other sensors, would again require replacing the entire system and downtime for a valuable service vehicle.

SUMMARY

It is desirable to have a vehicle modular accessory mounting system that installs easily on the target vehicle while ensuring full illumination of the area of interest without shading due to suboptimal installation location. Furthermore, it is desirable to have a flexible system that can be configured to provide the desired illumination level at each specific location on the vehicle. Still, further, it is desirable to have a system that supports multiple illumination modes and to configure the output of the system to match the needs of the user's specific conditions. Additionally, it is desirable to have a system that offers not only illumination but also provides optical output modes that include, ID marker lights, clearance marker lights, DOT required marker lights, FMVSS108 required auxiliary lighting, configurable flash, multiple colors, and traffic signaling "Various embodiment implementations advantageously fill these needs and address the aforementioned deficiencies by providing an extruded mounting rail designed to conform to the edge of the installation vehicle to provide a low-profile installation that casts no shadows due to the vehicle obstructing the illumination path" Additionally, various embodiment implementations, in accordance with the present disclosure, may feature addressable illumination modules that respond to control messages from an interface module to set the illumination module's output color and provide control of the brightness of each output channel in each illumination module. This allows the system to support many configurations of output color, brightness, light distribution pattern as well as additional alert and traffic signaling functions which include but are not limited to traffic directing, traffic advising, flashing white, flashing color and light motion effects with white or color light.

In an embodiment according to the present disclosure, a vehicle modular accessory mounting system may include: an extruded mounting rail designed to fit the installation vehicle, rail mountable illumination modules and a rail-mounted communications module. In some embodiments these components may be connected as follows: (1) a contoured extruded rail with mounting slots, that attaches to the edge of the vehicle; (2) one or more accessory modules that attach to mounting slots in the extruded rail; (3) a communications module that attaches to the mounting rails and receives signals from the vehicle and distributes power and control messages to the accessory modules using two or more conductors via integral electrical terminals built into the module or external wiring linking the module, with communication taking place over the power wires, over one or more dedicated communication wires or via wireless connection.

Some embodiments of the control module and accessory modules feature integral electrical connectors that with two or more conductive sockets that mate with conductive pins to allow power and control signals to be related between the adjacent accessory modules via the electrical connecting pins. Other embodiments may feature connections made via external wiring with two or more conductors, that use waterproof connections to provide additional module positioning flexibility. Furthermore, some embodiments may include conductive sockets on one side of the accessory module and conductive pins on the other side of the accessory module, allowing accessory modules to connect to one another without the need for external conductive pins, much like LEGO bricks connect to one another.

In some examples, an embodiment implementation may include one or more of the following: the extruded mounting rail may be curved to match the curvature of the target vehicle installation location; a system may include more than one control module; the system may feature power only modules for delivering additional power to the accessories; the system may feature one or more control modules equipped with LAN or WAN wireless connectivity, for example including but not limited to Wi-Fi, Bluetooth, IEEE 1609, IEEE 802.11, ETSI ITS-G5, LTE, C-V2X, or derivative wireless standards; illumination modules may be configured with an RGB output for their fourth channel; illumination modules may be addressable to allow each module to configure each of its output channels independently from the other illumination modules; the system may include external connections for communication with an alert system, for example, HAAS Alert, or Digital Alert Warning System—DAWS, or other alert systems, to receive, respond to, or generate emergency vehicle related signals.

The disclosed embodiments are unique when compared with other known devices and solutions because provides:

3

(1) quick, easy and secure installation, via an extruded rail featuring longitudinal slots in two planes, allowing a configurable number of modules to be installed at any location on the rail, with the rail attaching to two planes to a vehicle's edge, with examples including but not limited to, a first plane being the vehicle roof and a second plane being the area above the vehicle windshield in line with the windshield, or similarly the top surface of a vehicle and a mating vertical surface of the vehicle, providing a strong, secure module mounting location with optimal positioning for optical performance while allowing a flexible number of modules to be placed anywhere along the mounting rail; (2) a modular system allowing many different configurations that can be easily modified, serviced and upgraded, including adding and removing accessory modules as needs evolve or new modules are released; (3) a versatile system that allows exactly the amount of illumination to be placed at the desired location with the desired distribution pattern; and (4) optional addressable mode for illumination modules that allow implementation of traffic directing functions and high visibility alert patterns.

The secure, convenient mounting location on the vehicle edge, the availability of vehicle power and bidirectional communication via the communication module provide ideal mounting locations for other vehicle accessory modules, including sensing modules that may collect information and or output modules. Output modules may include, but are not limited to laser outputs with either single beam, multiple beam or grid patterns in the visible and or infrared spectrums, UV or IR Light Sources, light sources with warmer or cooler color temperature than the primary LED light sources, RF emitters, audible output emitter. Sensing or detection modules may include, but are not limited to sensors capable of measuring, recording or detecting: temperature, distance, sound, vibration, light level, light color, motion, distance, video capture, image capture, detection of microwave or RF signals, receptions of microwave or RF signals. Additionally, network connections may be used for storage, analysis or notification based on data acquired from the sensor modules.

The disclosed device is unique in that it is structurally different from other known devices or solutions. More specifically, the device is unique due to the presence of (1) a mounting system using a custom extrusion with a cross-section accommodating the profile of the mounting edge of the vehicle, that is straight or curved along its length to match the mounting, that provides attachment points in two planes and; (2) modular accessory modules, including illumination modules, with multiple channels of LEDs that can be controlled independently allowing the selection of color, brightness, and light dispersion pattern; and (3) communication modules that serve as a communications bridge between the illumination system and external networks, including but not limited to the vehicle onboard messaging systems.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The Vehicle Module Accessory Mounting System may, however, be embodied in many different forms and should not be construed as being limited to the embodiments set forth herein; rather, these embodiments are provided by way of illustration only and so that this disclosure will be thorough, complete and fully convey understanding to those skilled in the art.

4

DETAILED DESCRIPTION

Figure 1:
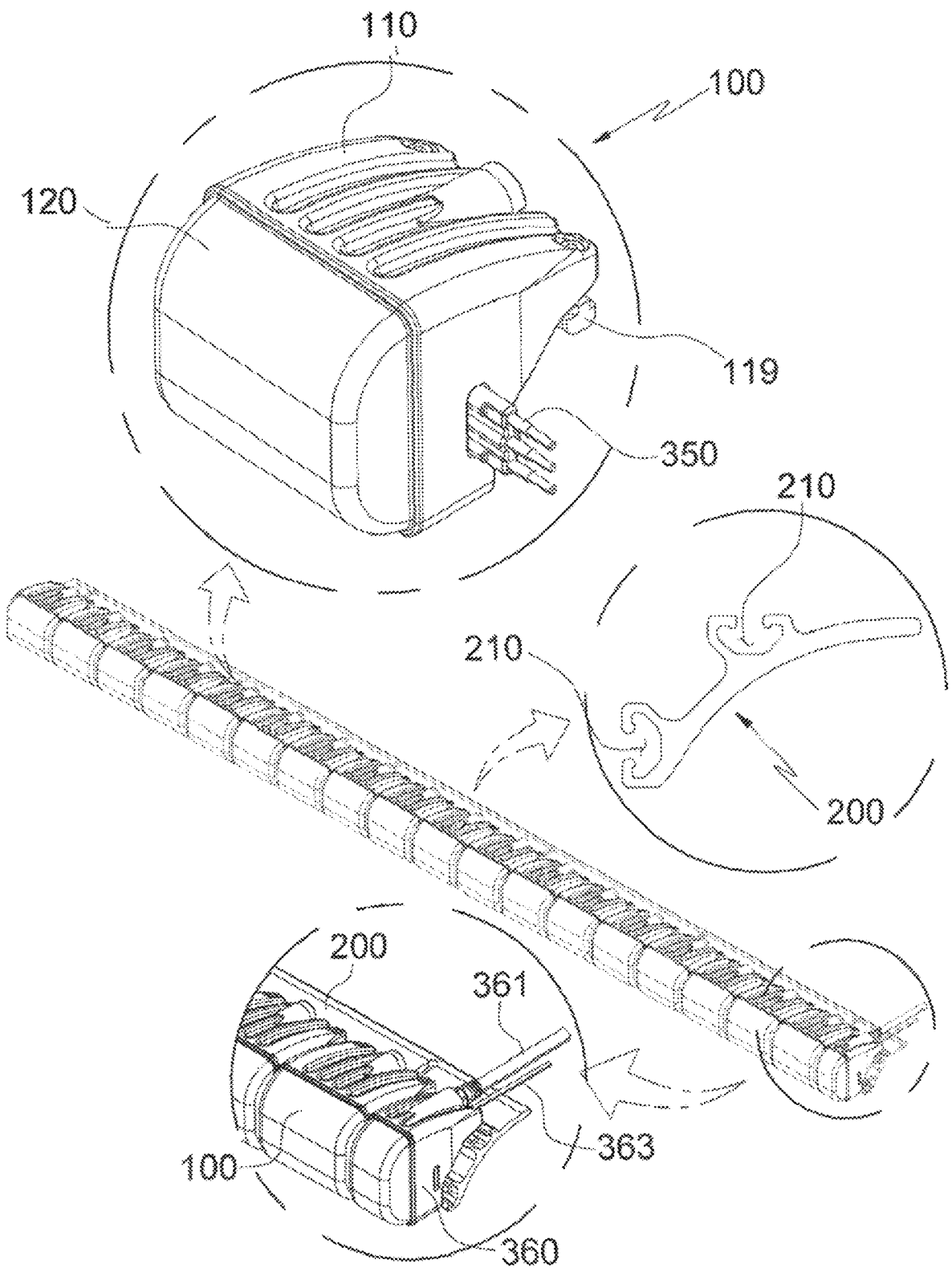
FIG. 1.—Highlights details of illumination module and mounting rail, showing how the modules may mount on an example rail.
Figure 2:
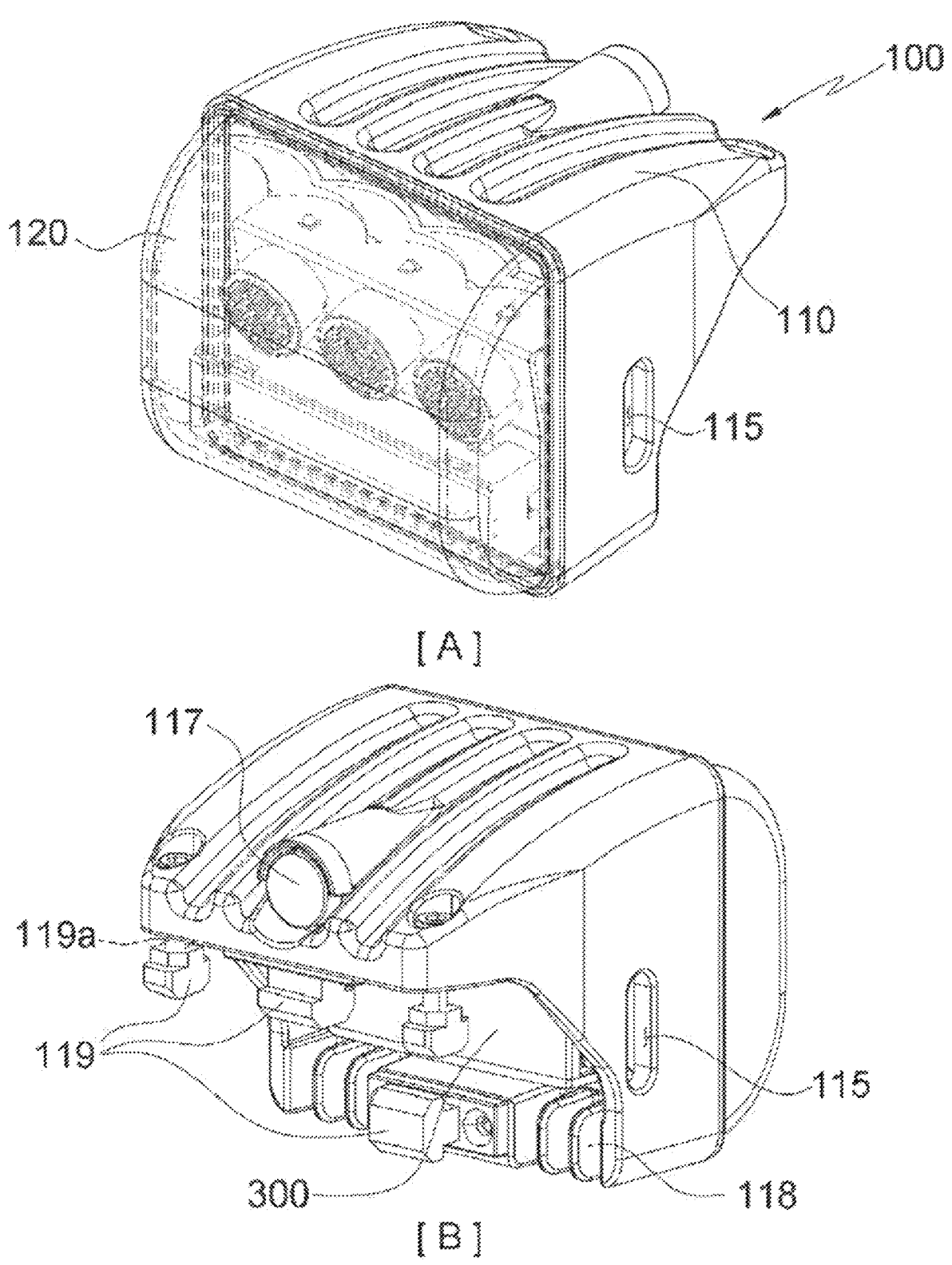
FIG. 2.—Front and back views of one embodiment of an illumination module.
Figure 3:
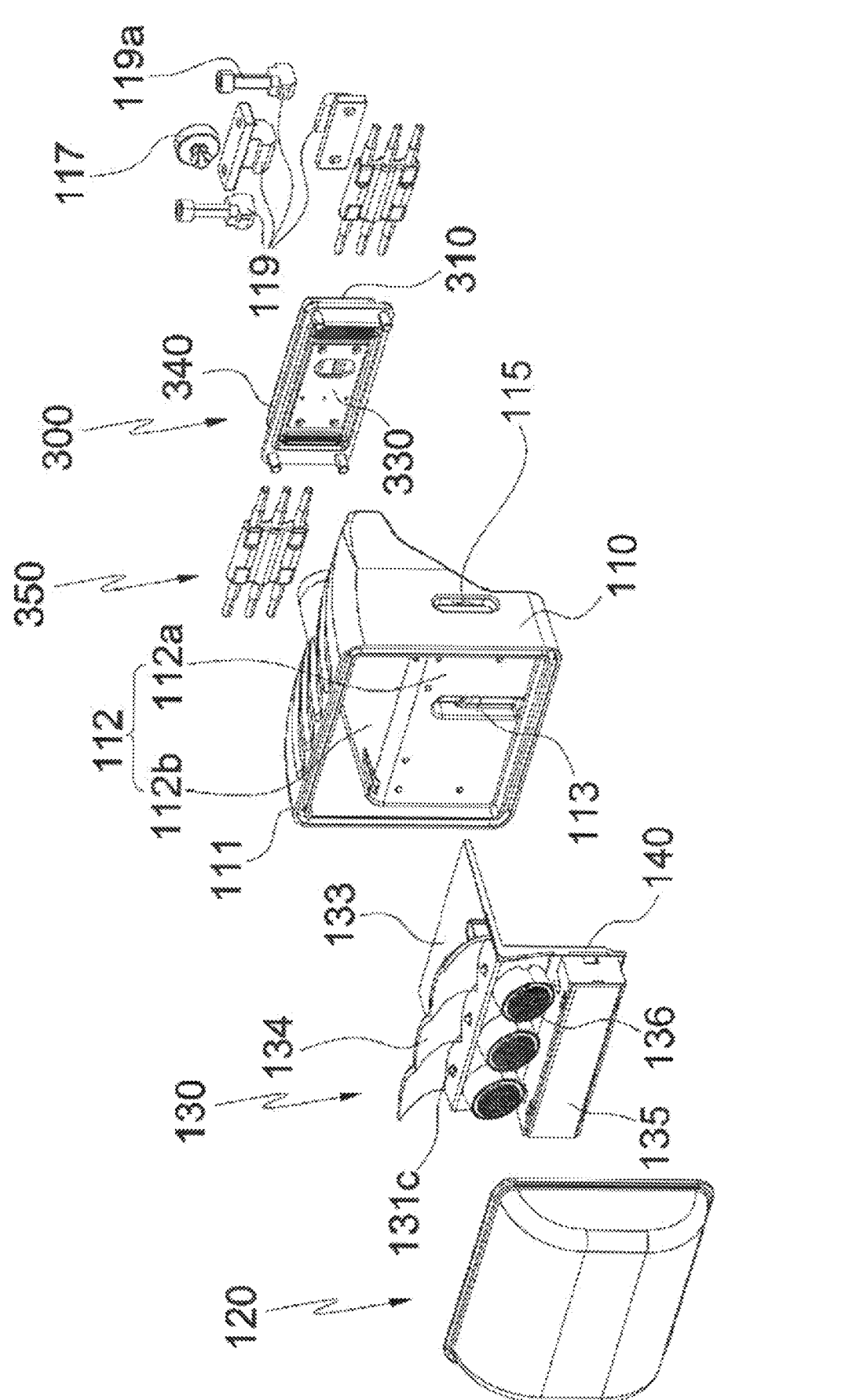
FIG. 3.—A frontward exploded view of one embodiment of an illumination module.
Figure 4:
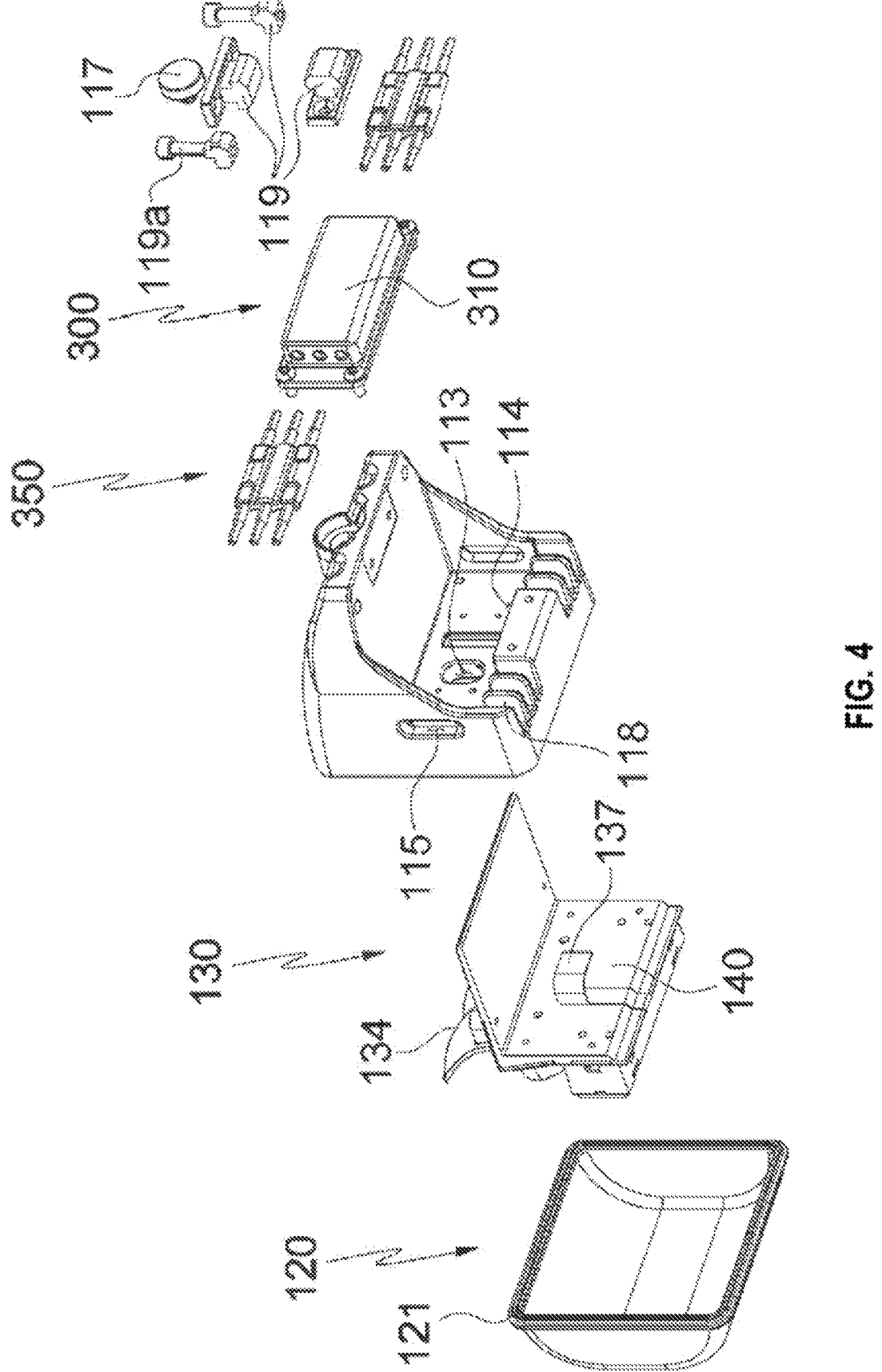
FIG. 4.—A rearward exploded view of one embodiment of an illumination module.
Figure 5:
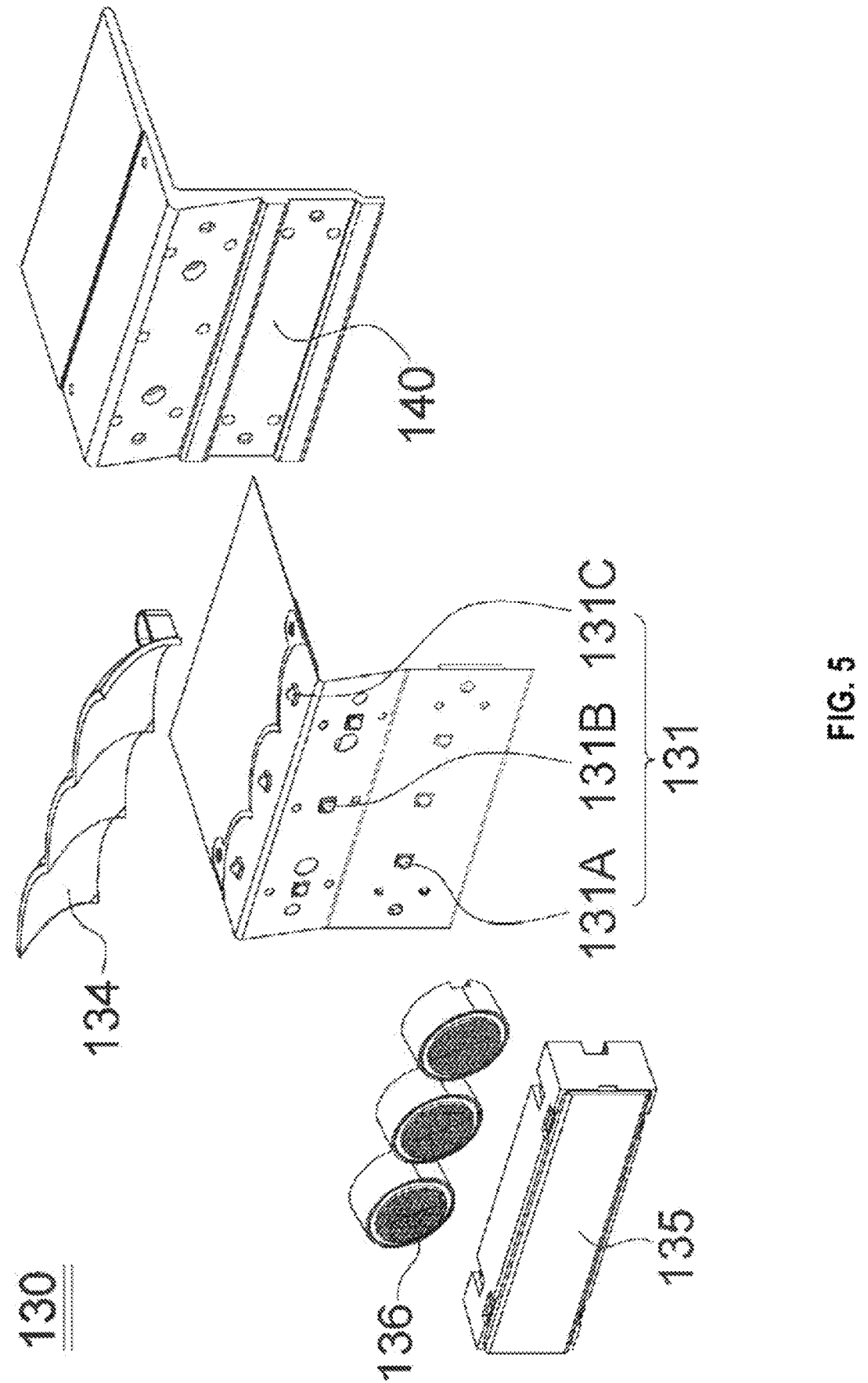
FIG. 5.—Exploded view of one embodiment of an illumination module showing example optics, printed circuit board and heatsink.
Figure 6:
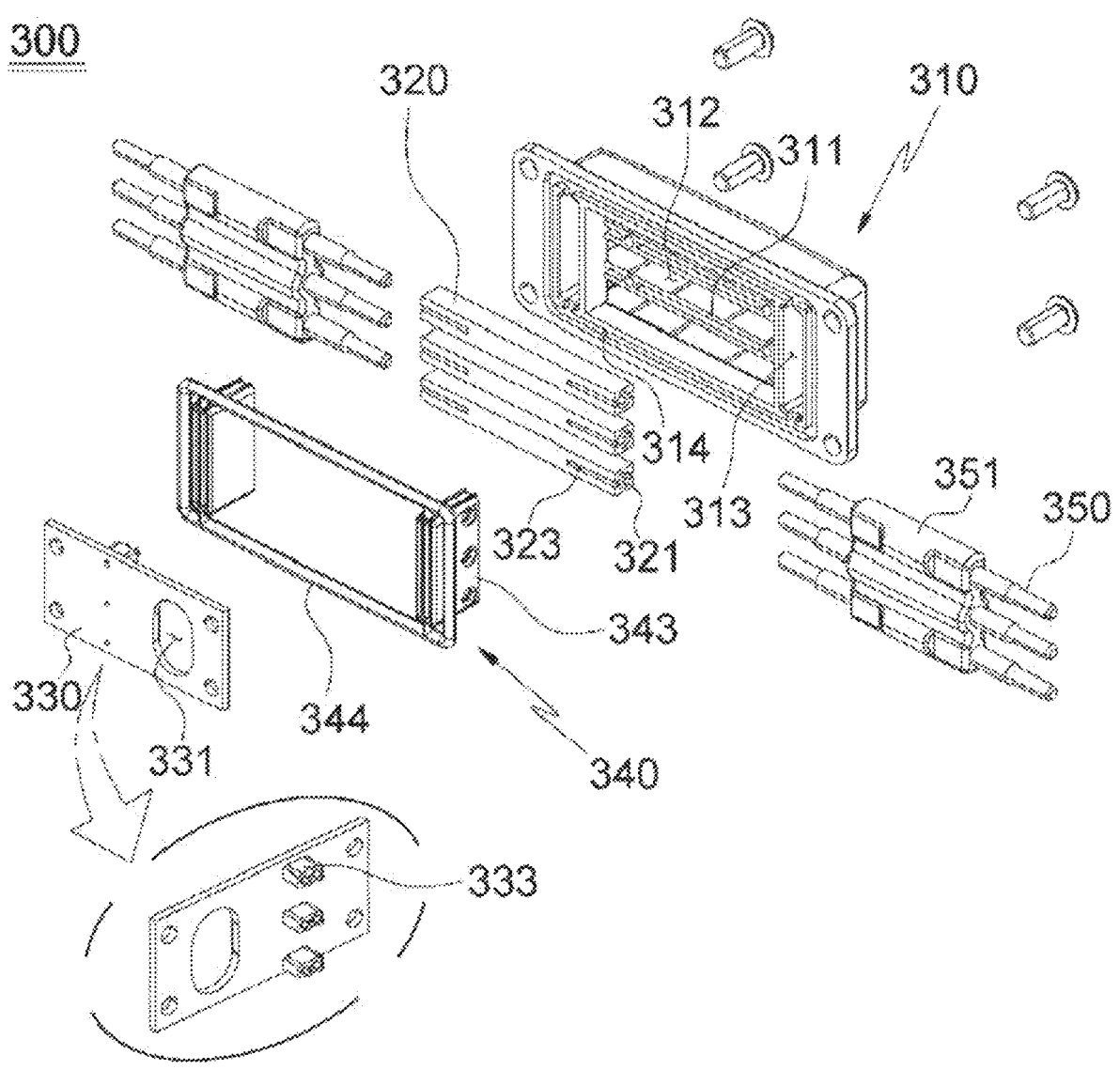
FIG. 6.—Exploded view of illumination module rear housing.
Figure 7:
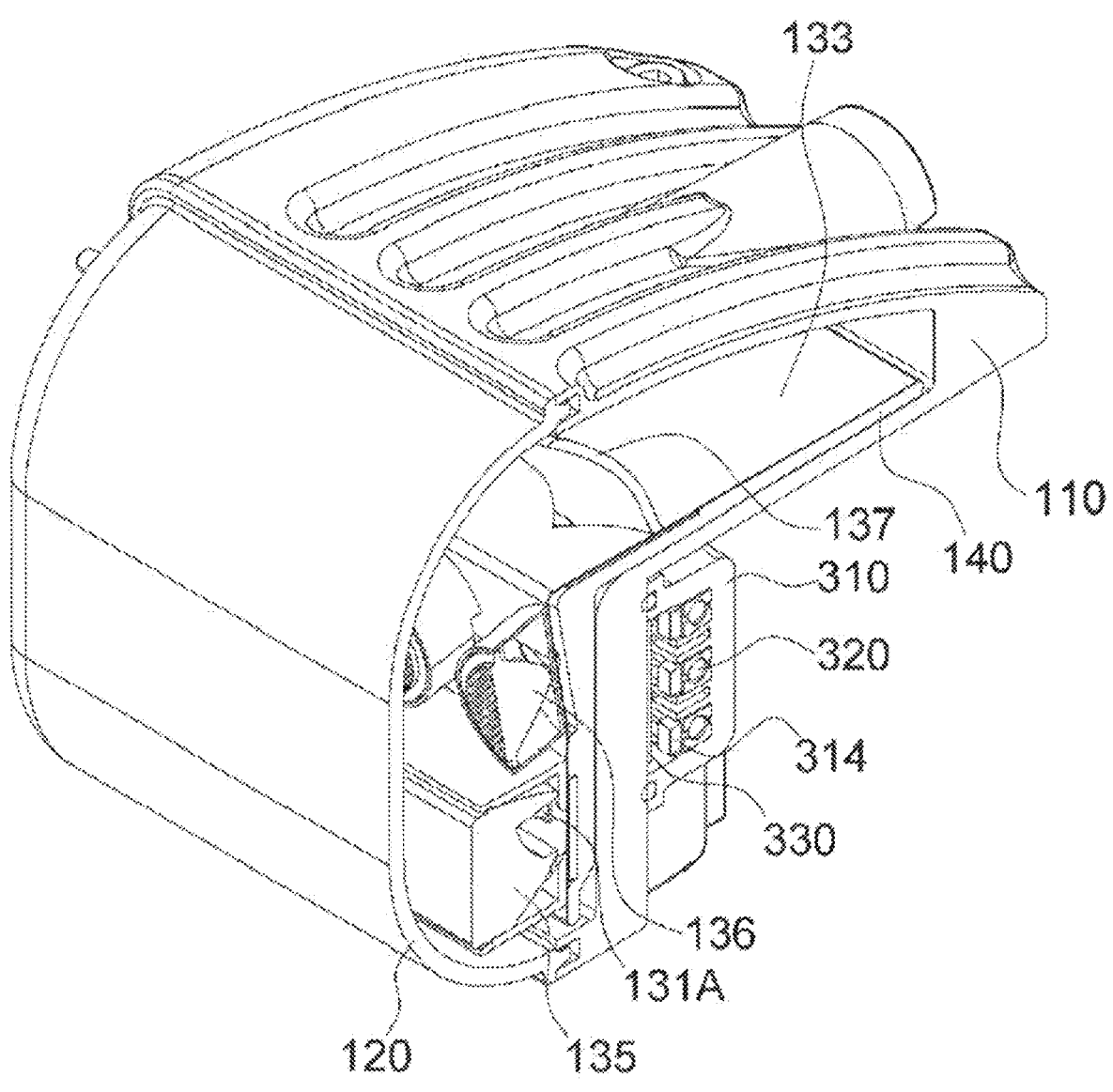
FIG. 7.—Cross-sectional view of one embodiment of an illumination module.
Figure 8:
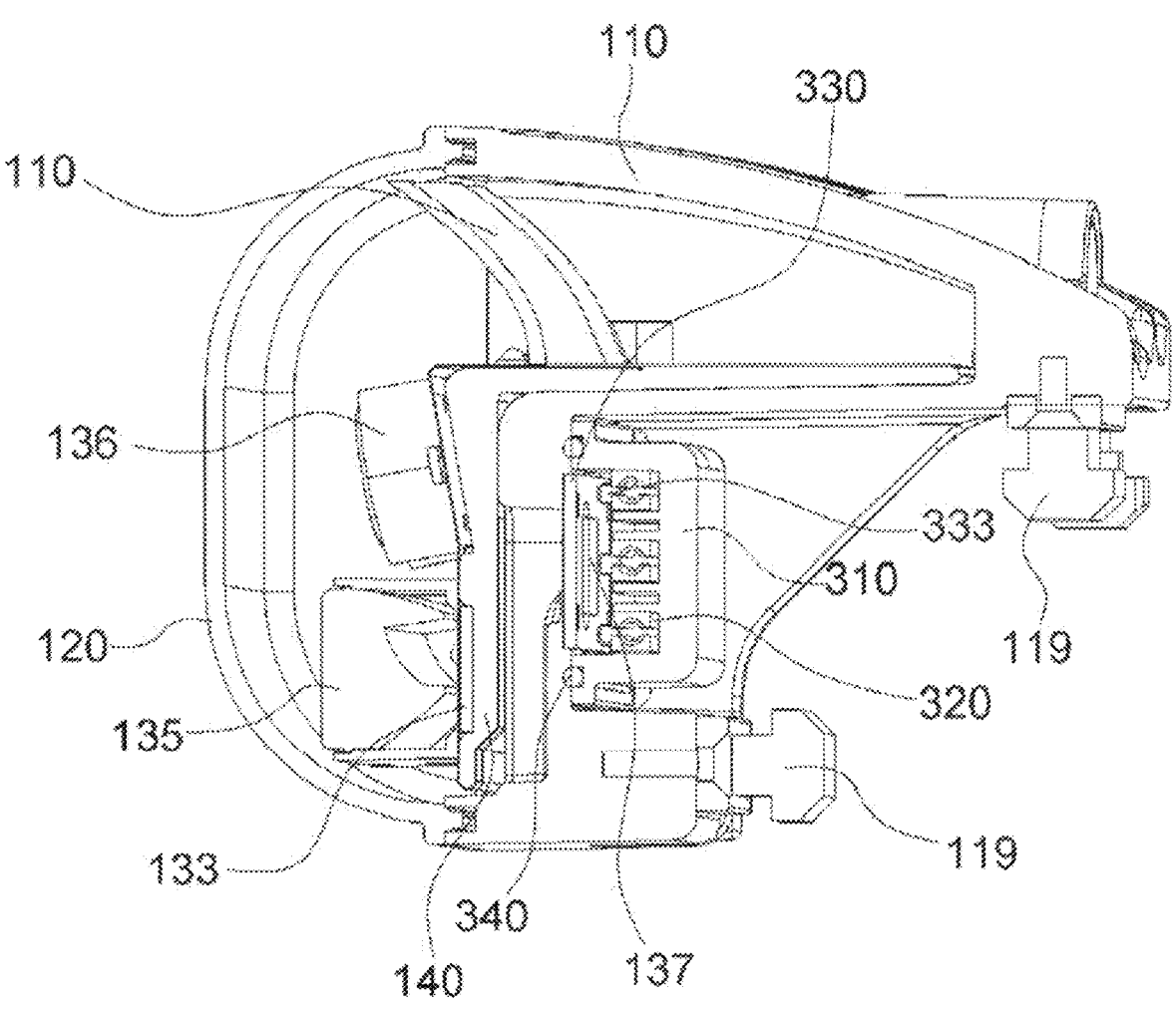
FIG. 8.—Profile cross-sectional view of one embodiment of an illumination module.
Figure 9:
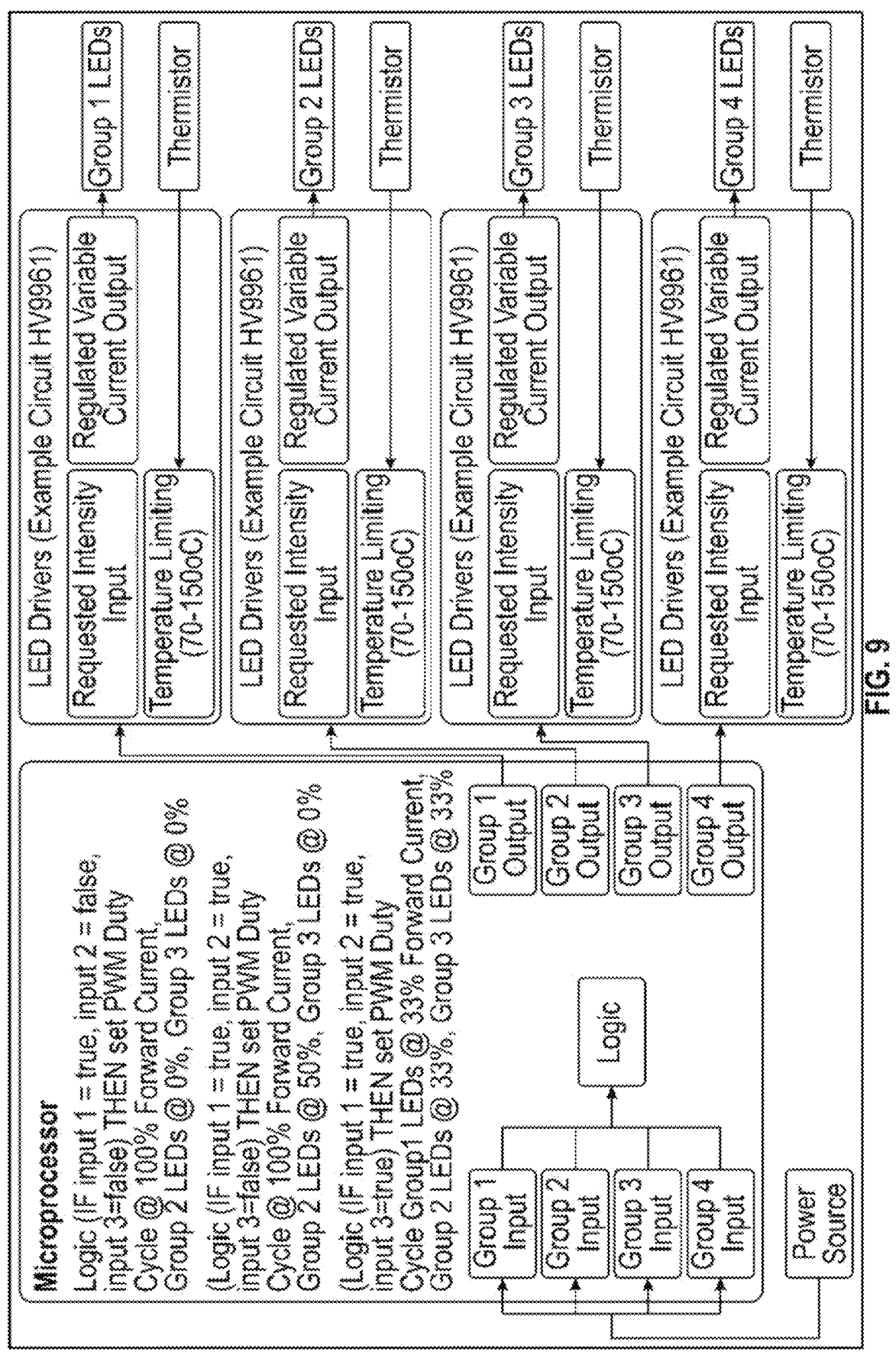
FIG. 9.—Diagram illustrating the driving of multiple LED channels for one embodiment of an illumination module.
Figure 10:
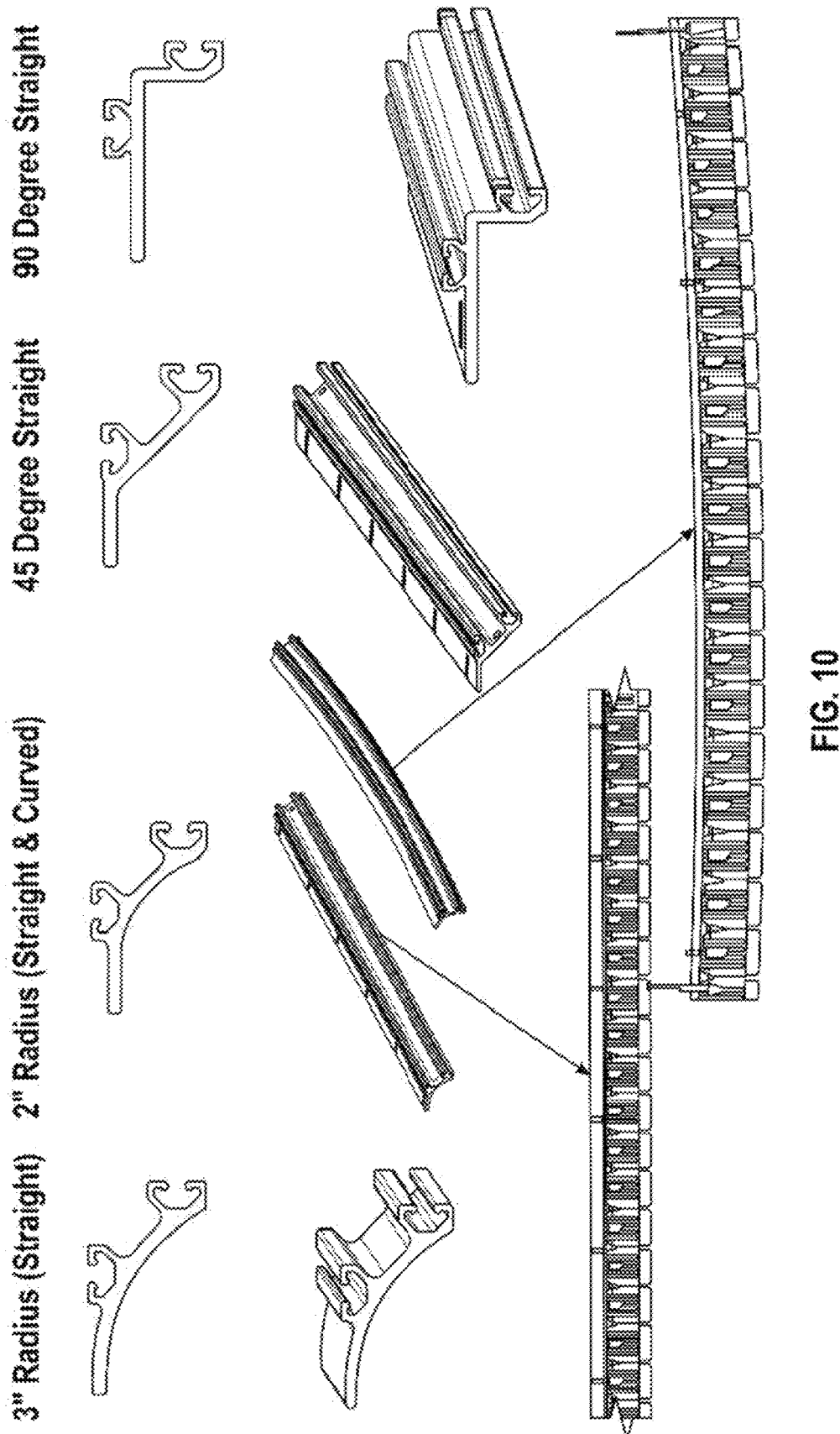
FIG. 10.—Example embodiments of an extrude mounting rail.
Figure 11:
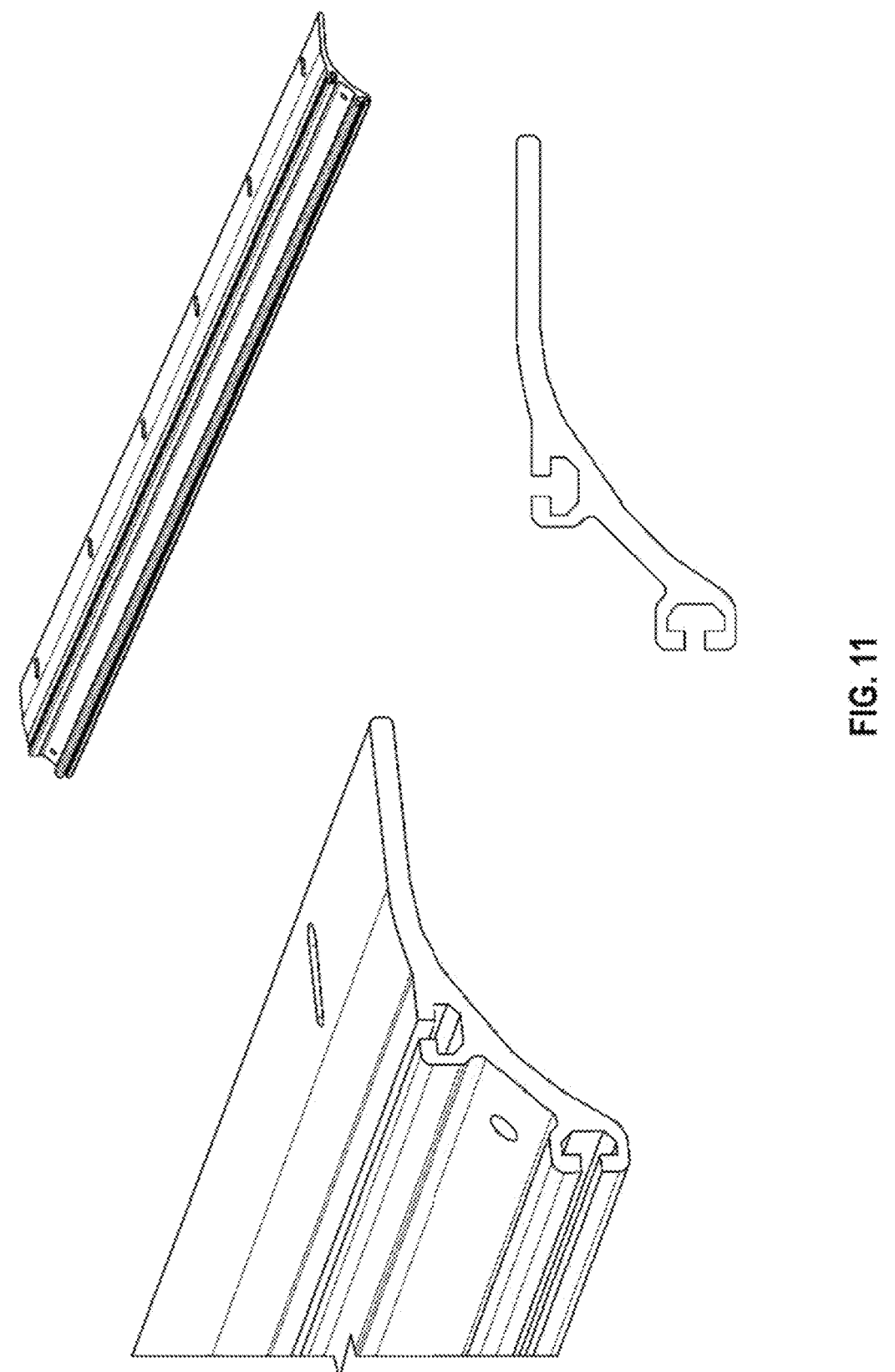
FIG. 11.—Example embodiment of radius profile rail showing vehicle mounting holes and slots.
Figure 12:
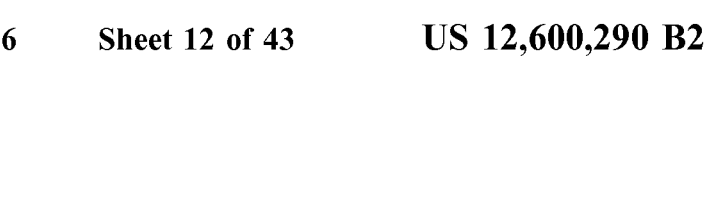
FIG. 12.—Example of 90 Degree Straight edge embodiment showing vehicle mounting holes and slots.
Figure 13:
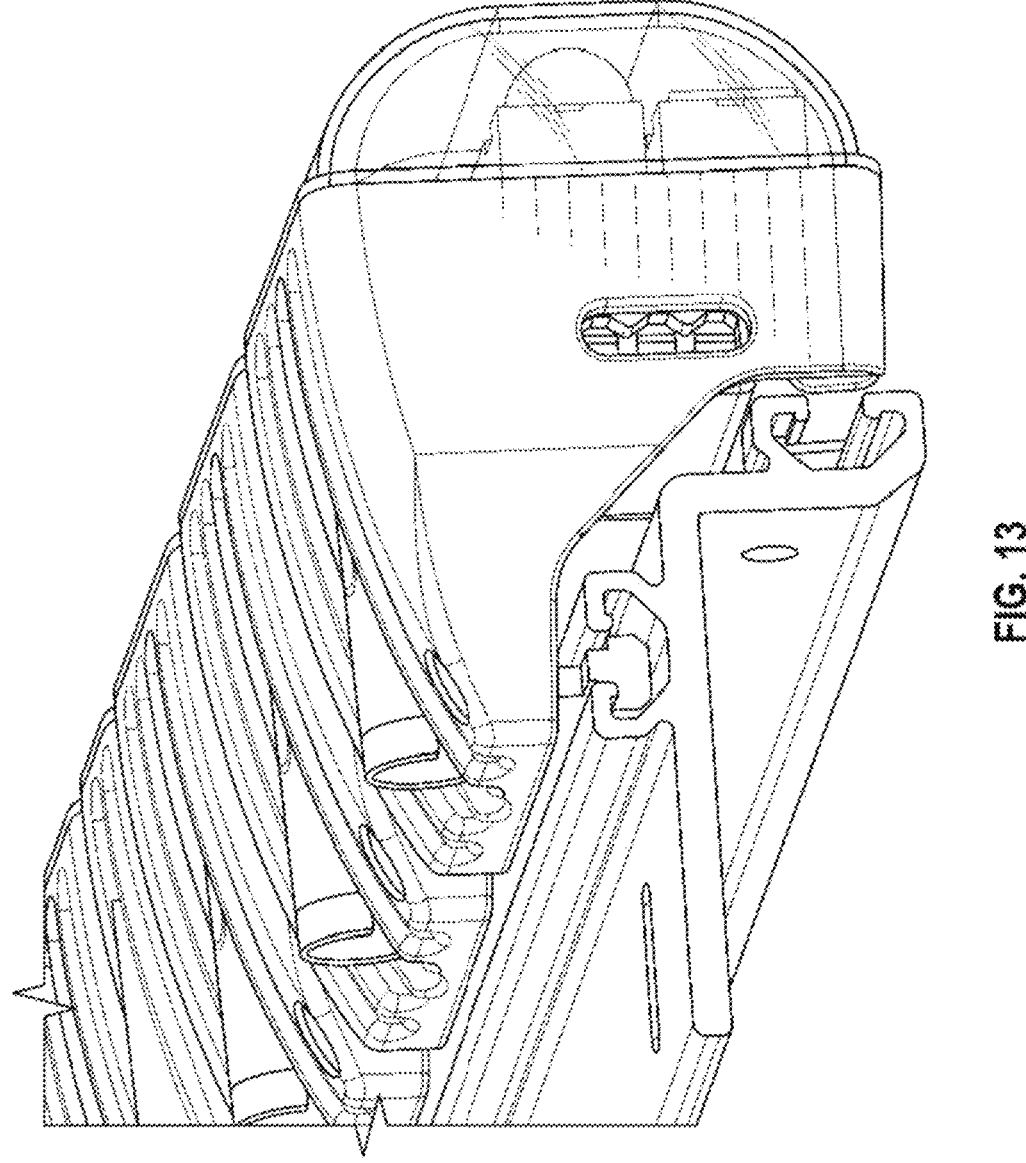
FIG. 13.—Illustration showing example 90 Degree Straight profile rail with mounted illumination modules.
Figure 14:
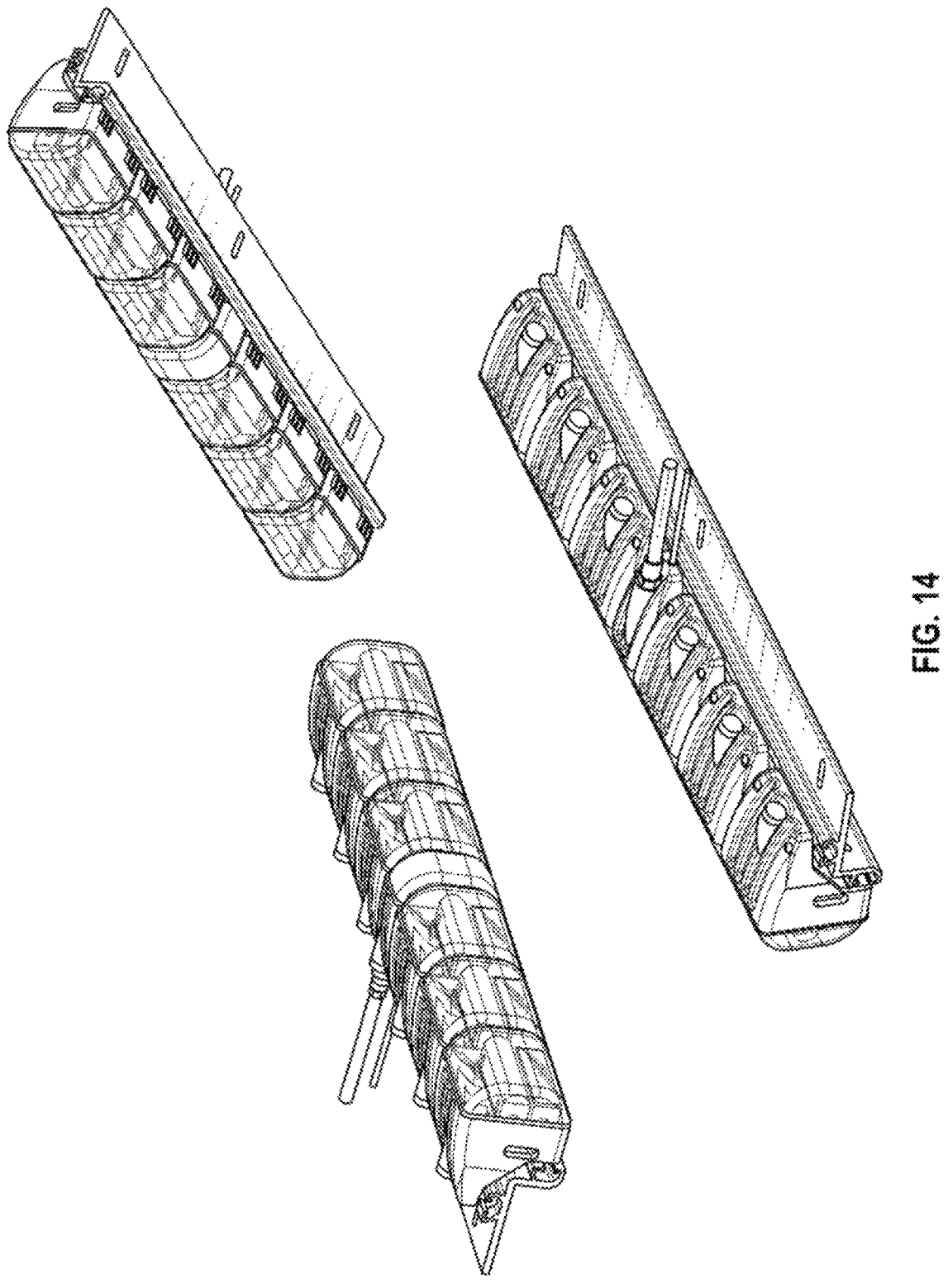
FIG. 14.—Example 90 Degree Straight edge rail embodiment with installed communications modules and illumination modules.
Figure 15:
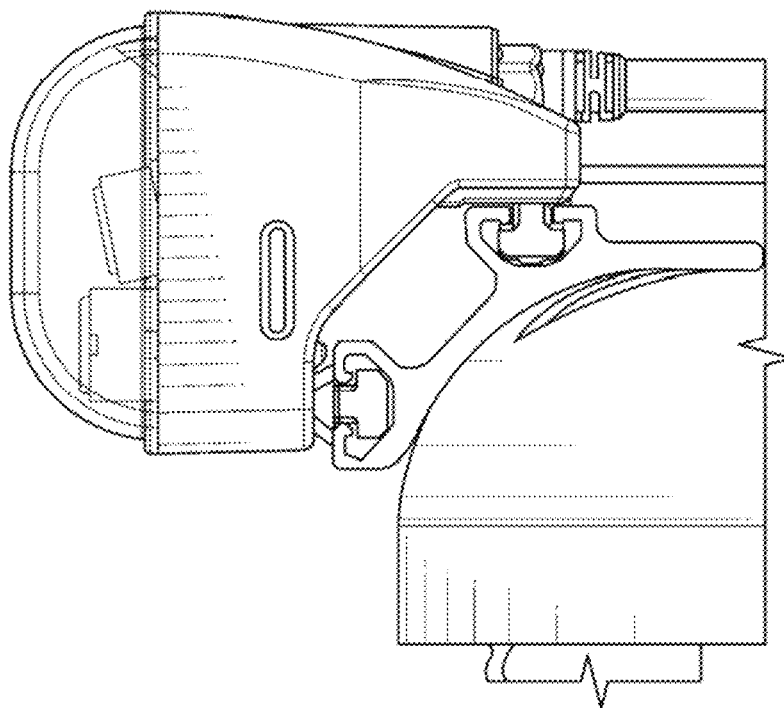
FIG. 15.—Illustration of radius profile mounting rail installed on a vehicle with communication and illumination modules.
Figure 15:
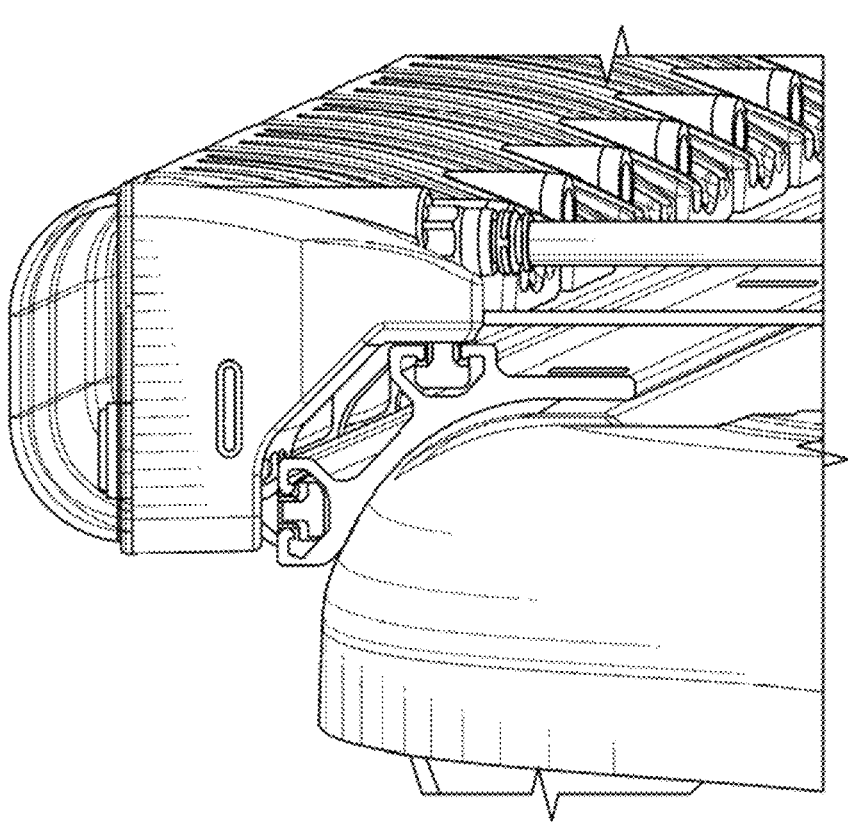
Figure 16:
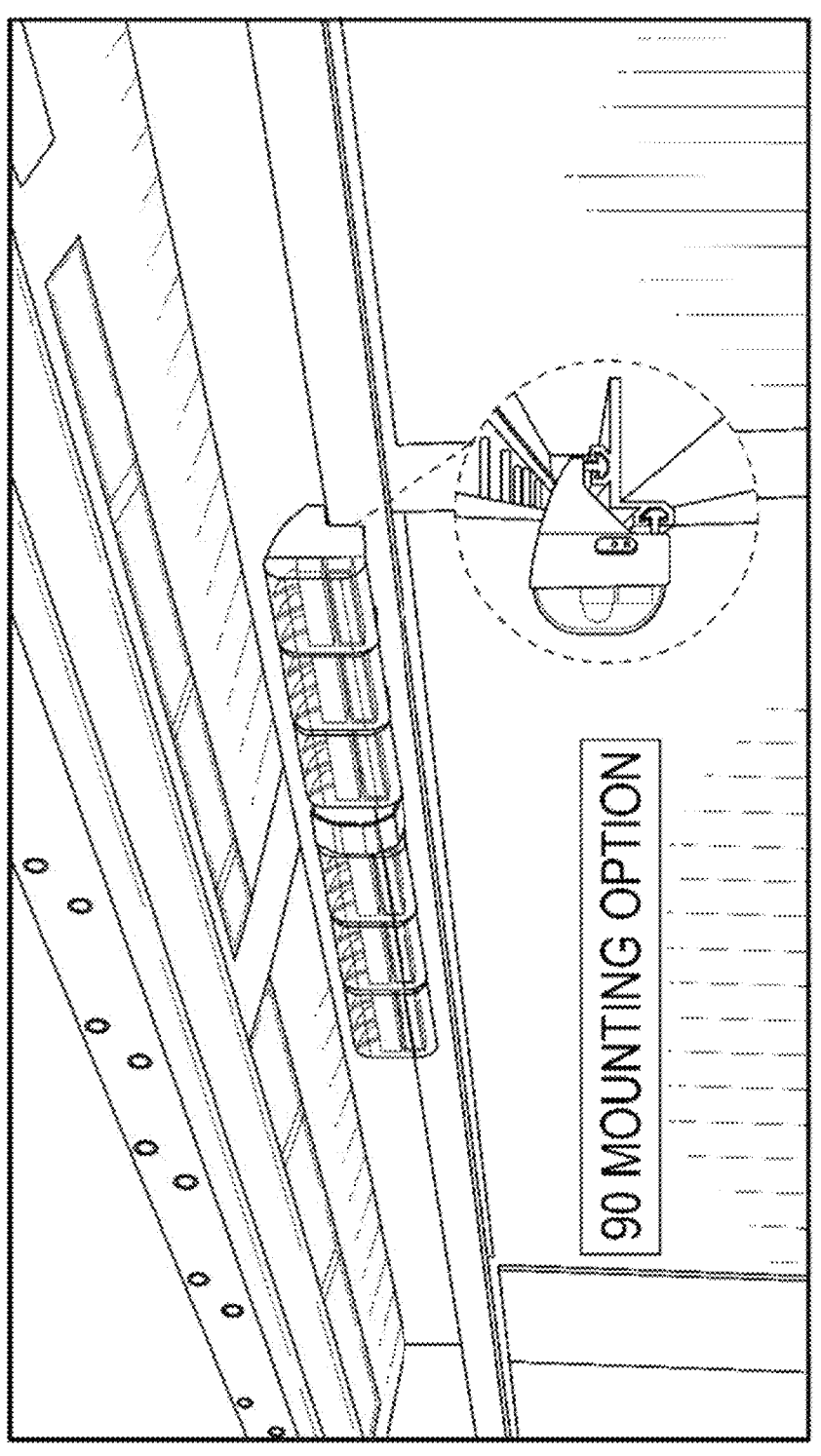
FIG. 16.—Illustration of a 90 Degree Straight rail populated with communication and illumination modules mounted on a vehicle.
Figure 17:
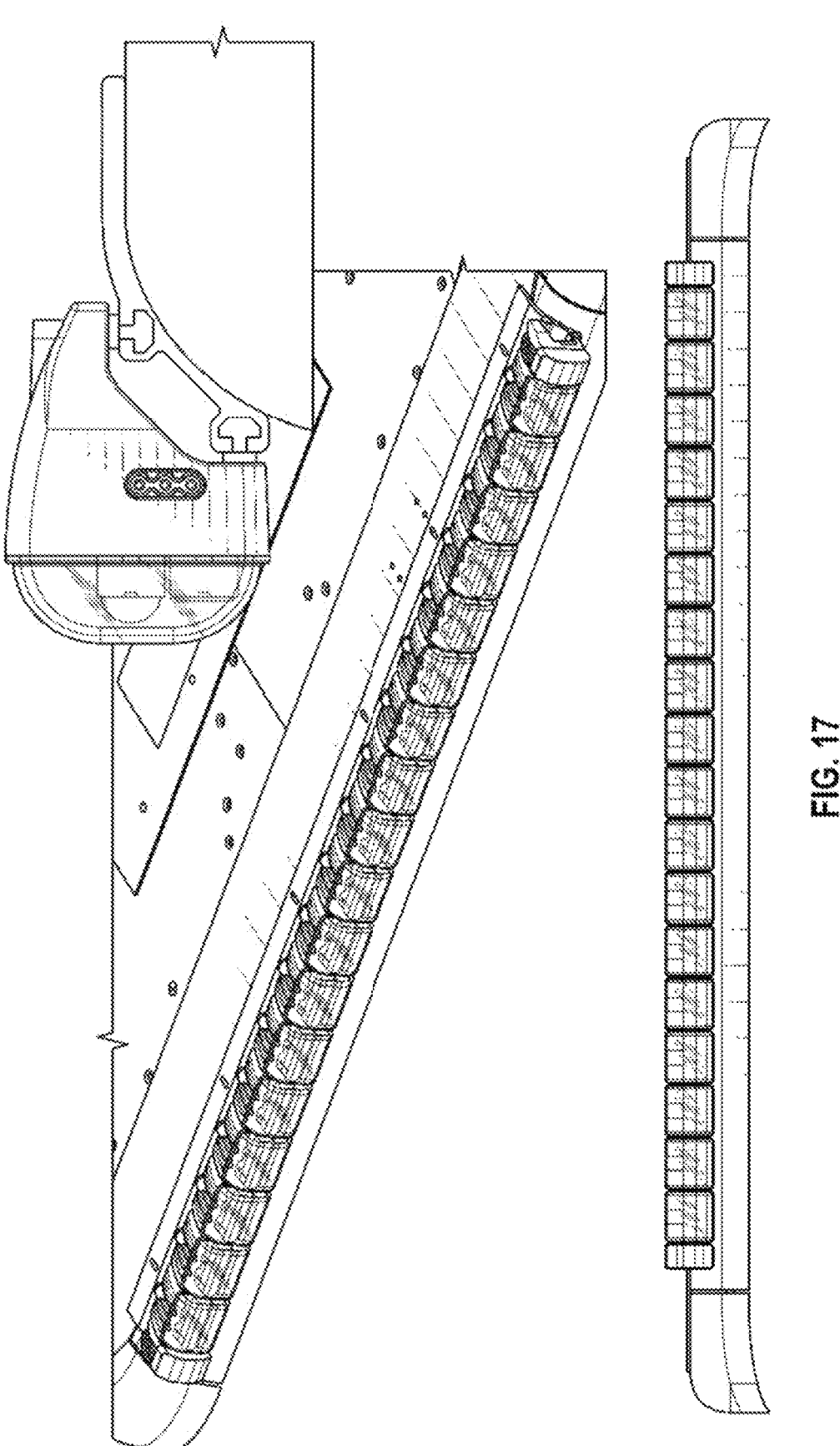
FIG. 17.—Illustration of a radius profile system with a communication module and power module, populated with illumination modules and installed on a vehicle.
Figure 18:
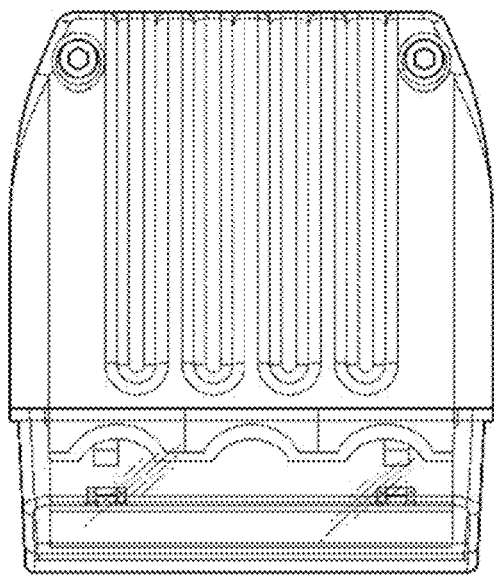
FIG. 18.—One example embodiment of an illumination module.
Figure 18:
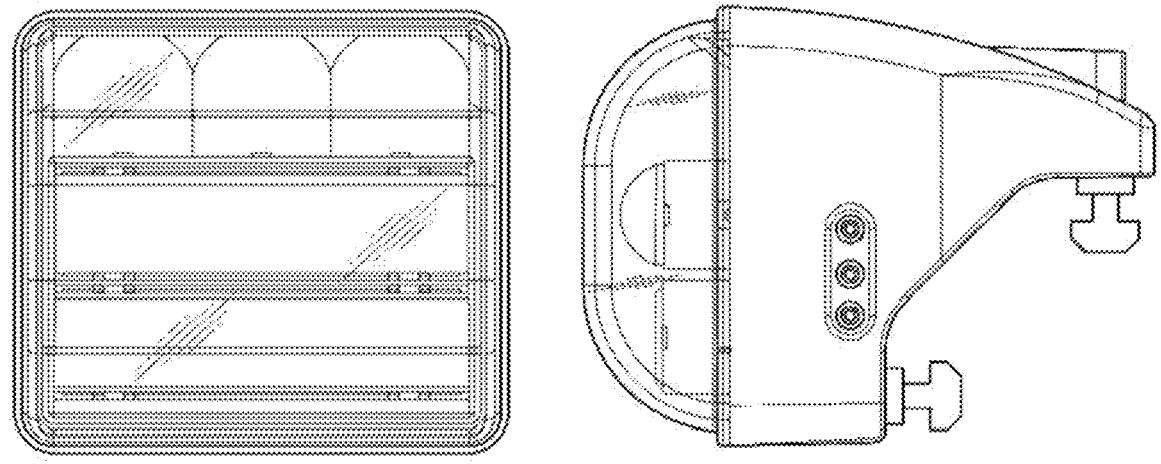
Figure 18:
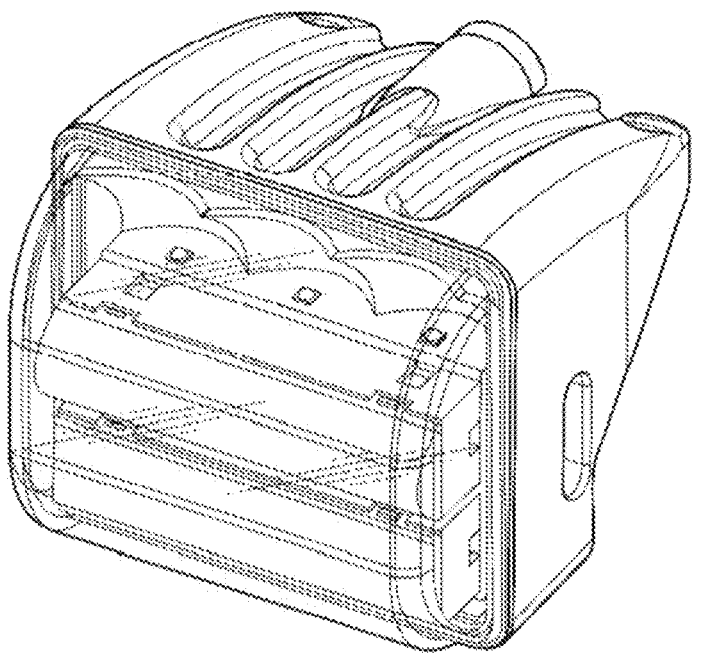
Figure 18:
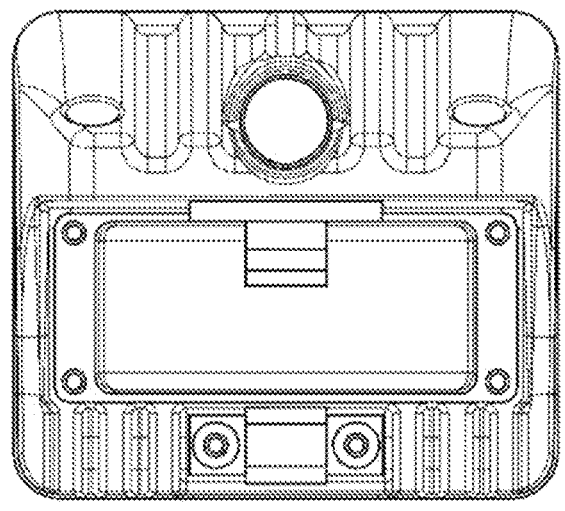
Figure 19:
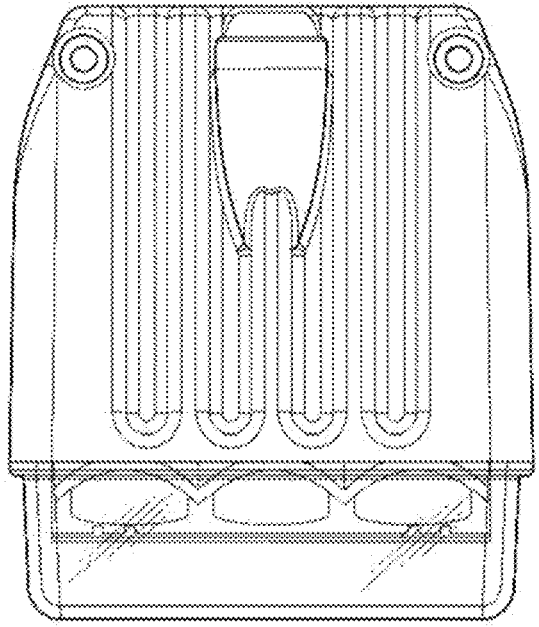
FIG. 19.—Another example embodiment of an illumination module.
Figure 19:
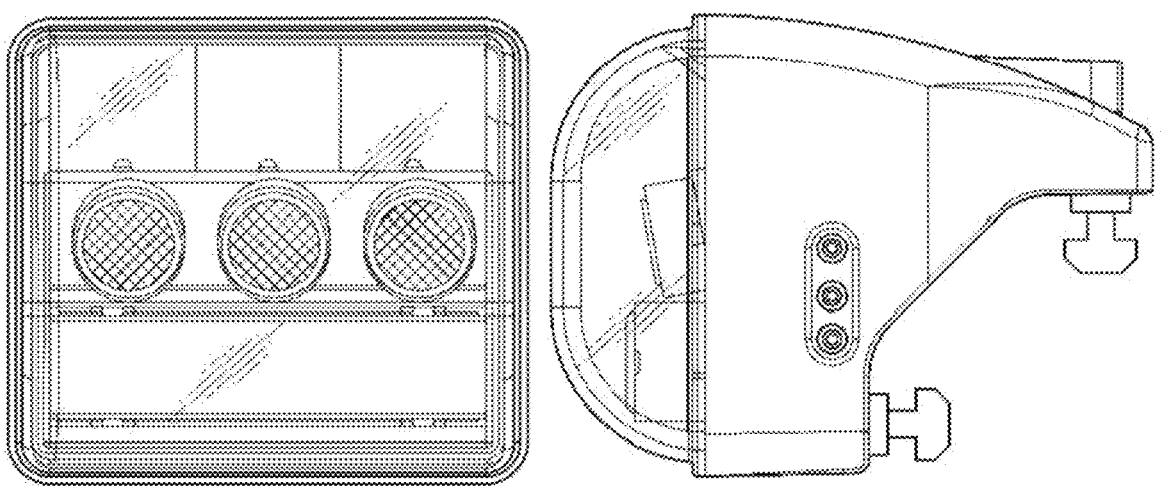
Figure 19:
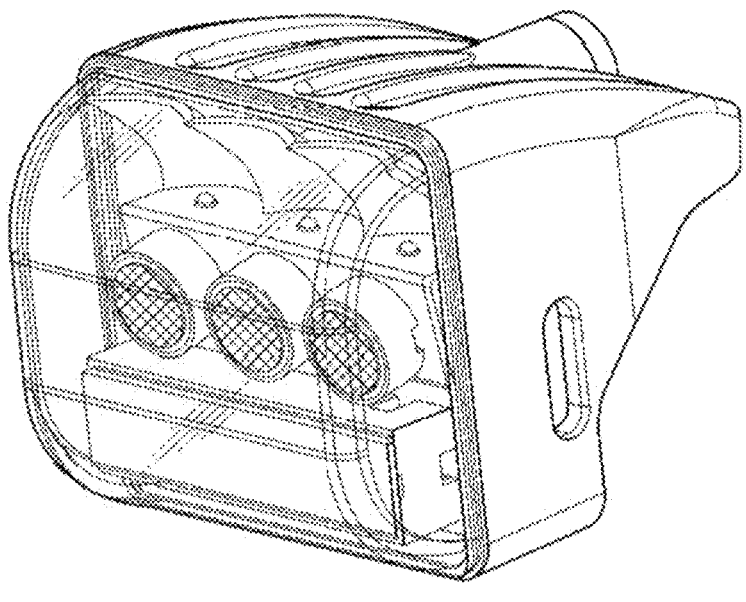
Figure 19:
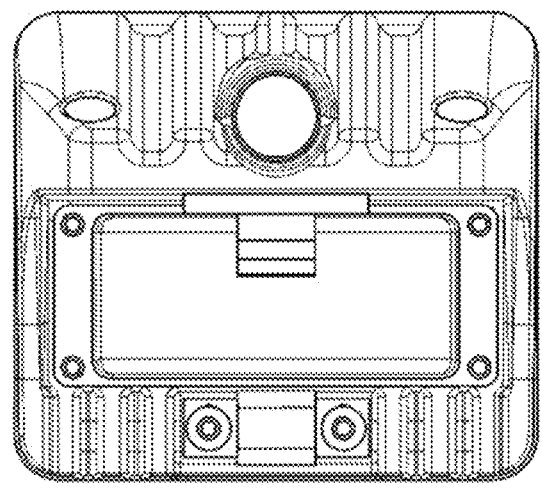
Figure 20:
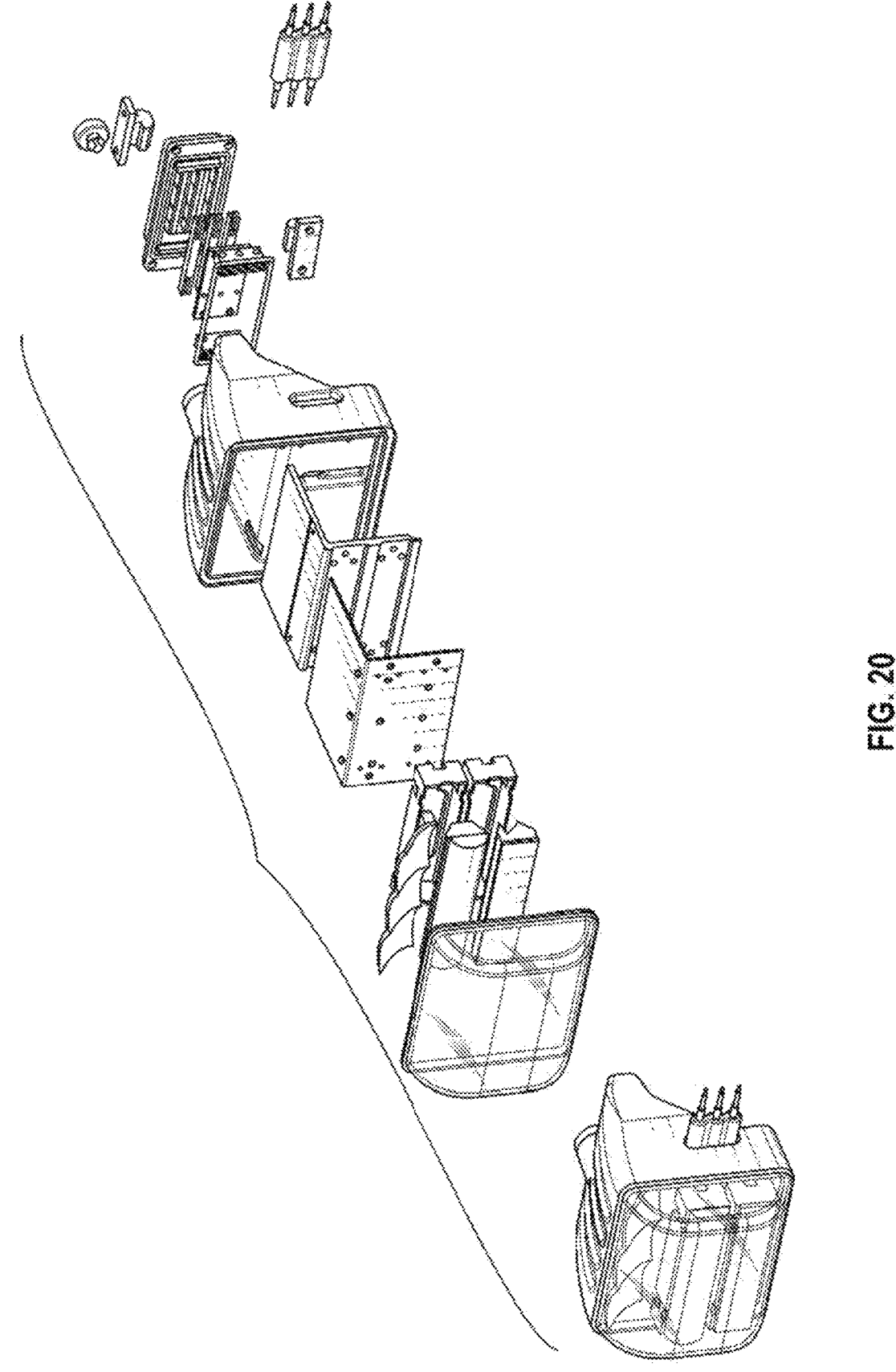
FIG. 20.—Exploded view of an example embodiment of an illumination module.
Figure 21:
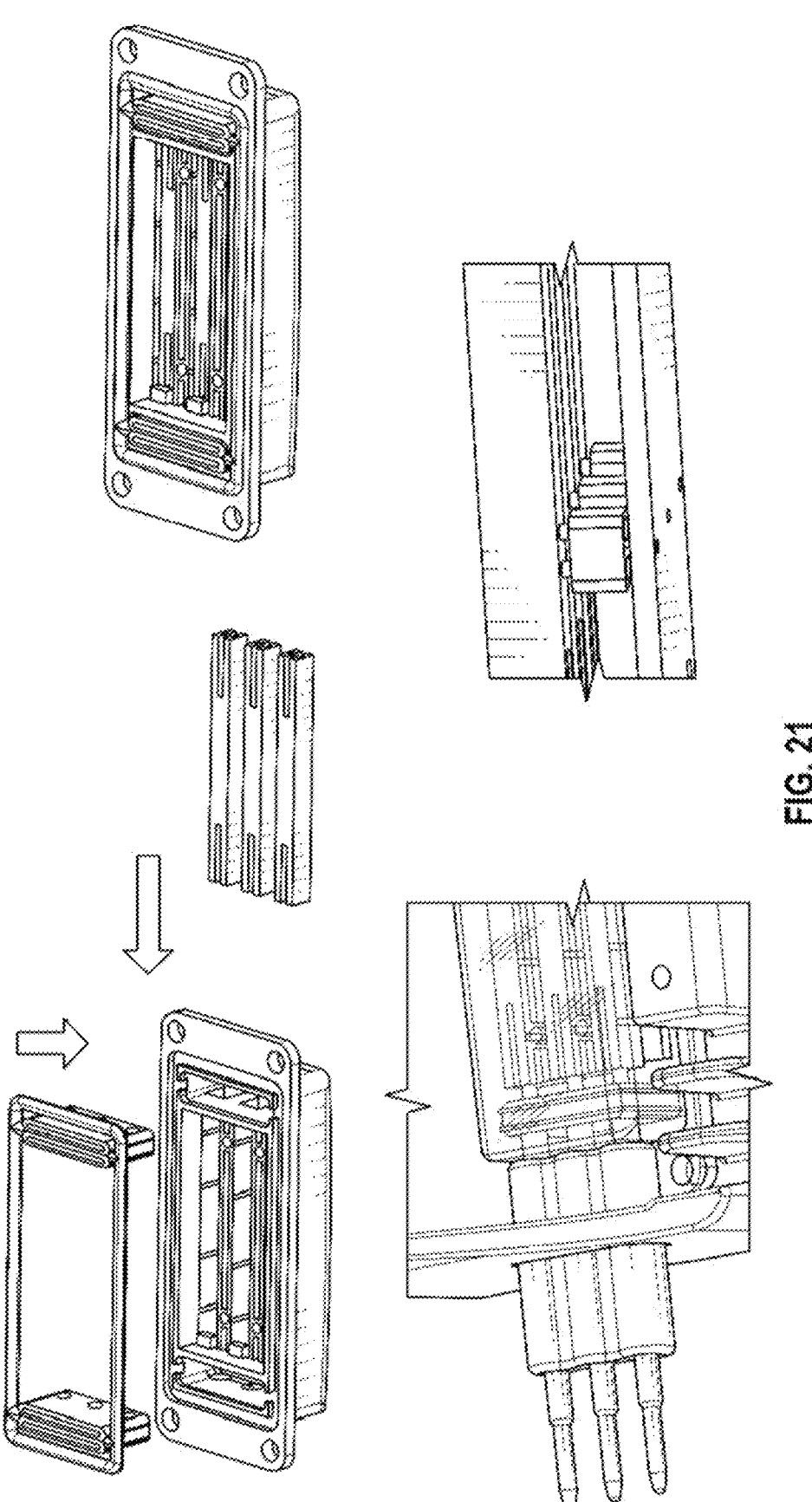
FIG. 21.—illustration of example accessory module power and signal connections.
Figure 22:
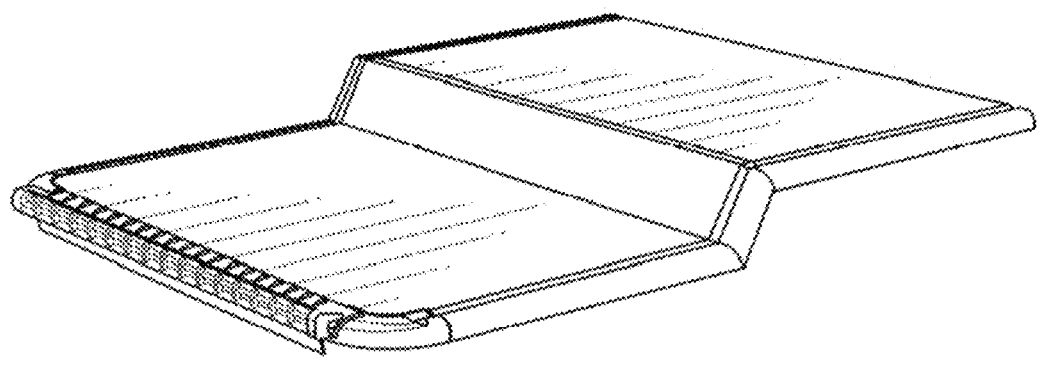
FIG. 22.—Illustrations of example modular auxiliary illumination systems installed on vehicles.
Figure 22:
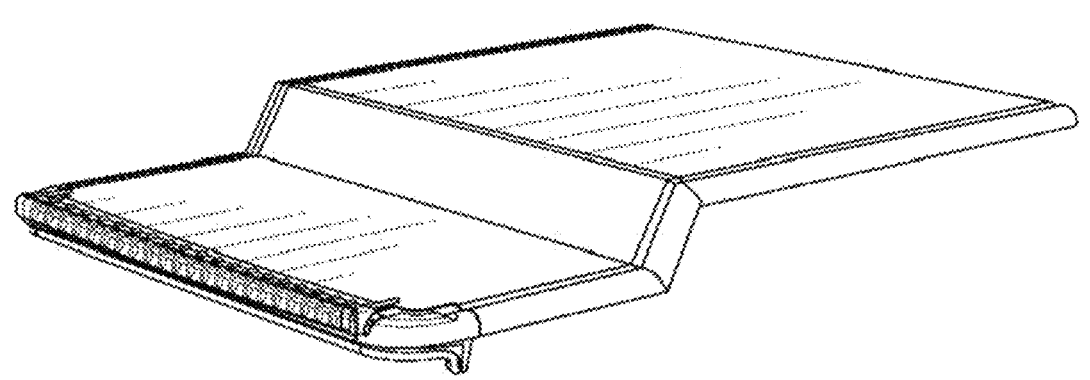
Figure 23:
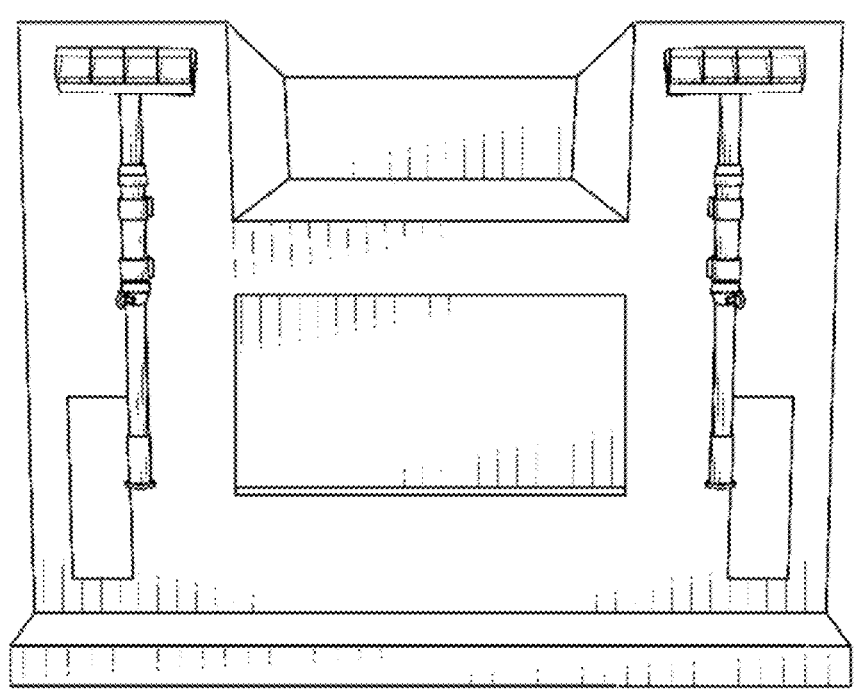
FIG. 23.—Example system embodiments mounted on poles.
Figure 23:
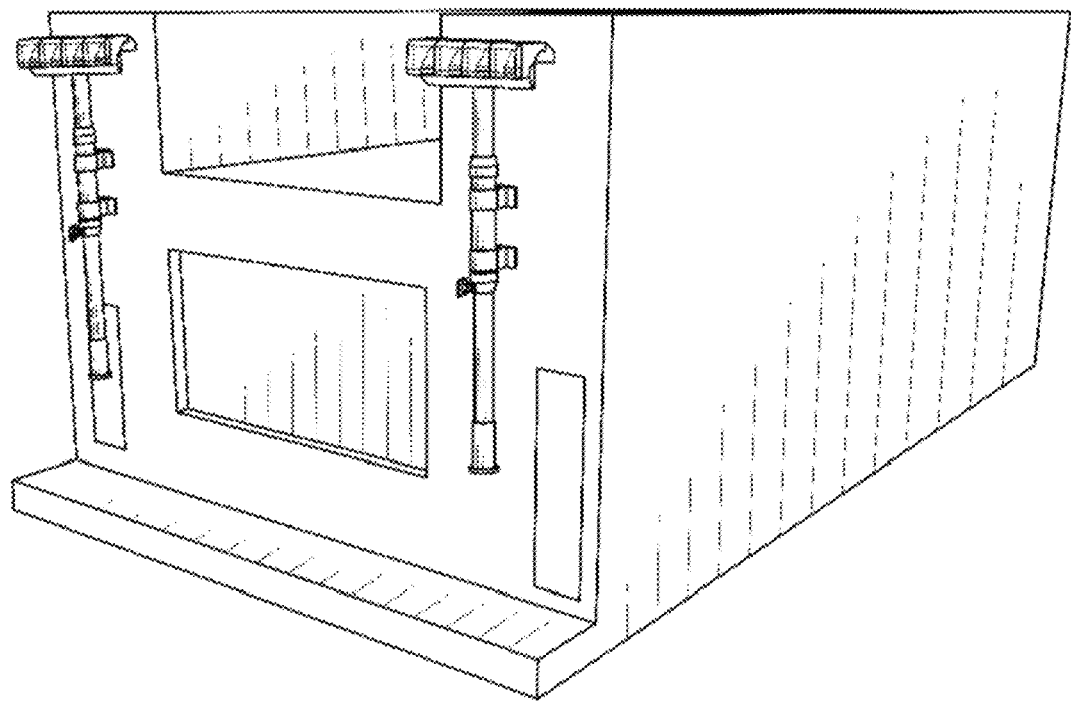
Figure 23:
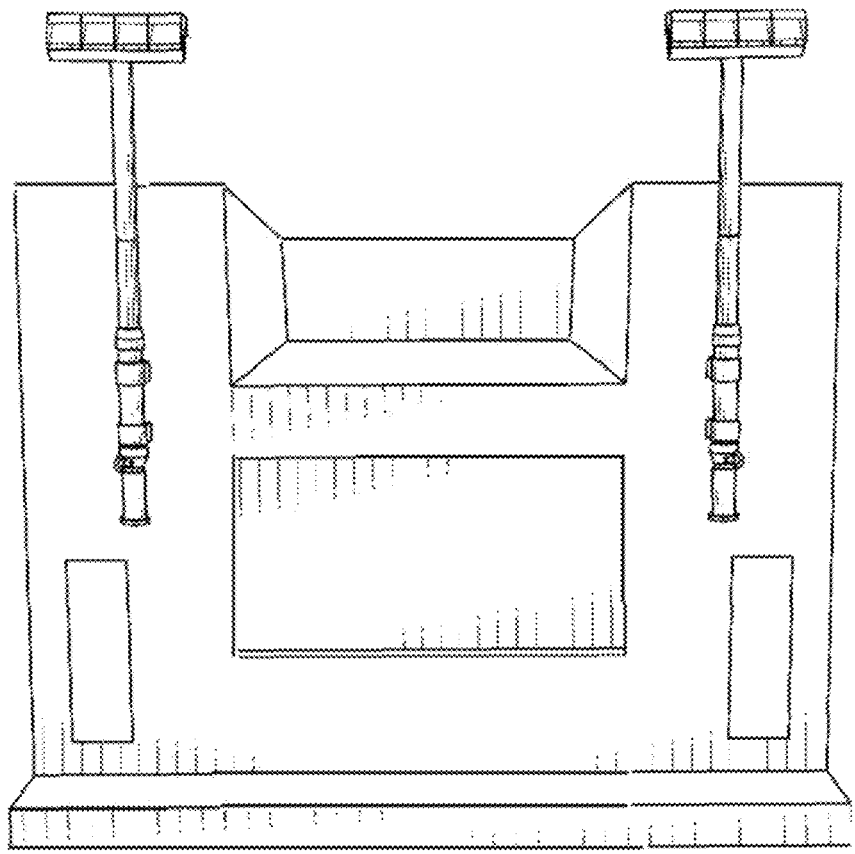
Figure 24:
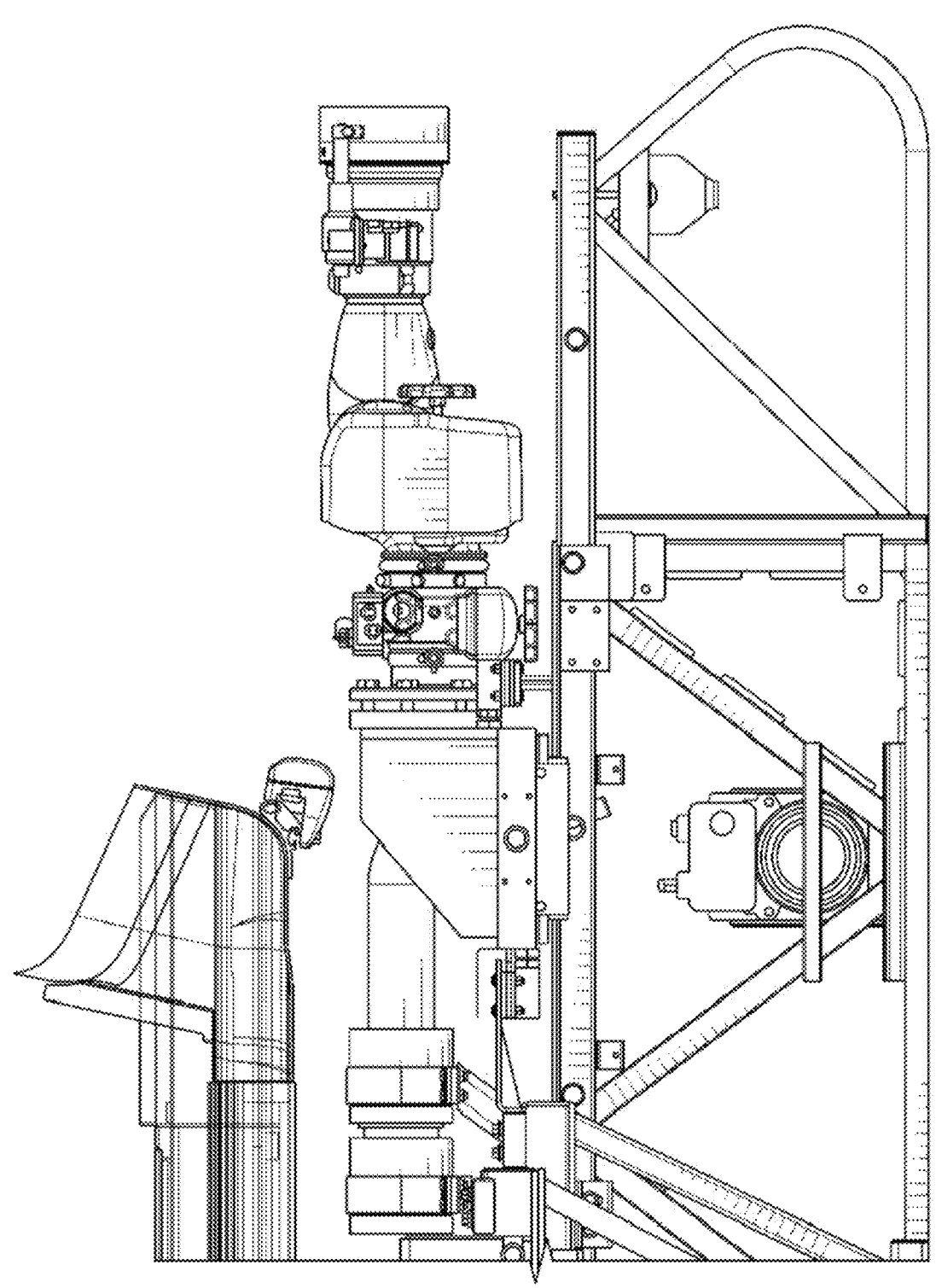
FIG. 24.—Illustration of a service vehicle requiring an illumination system with low mounting profile.
Figure 25:
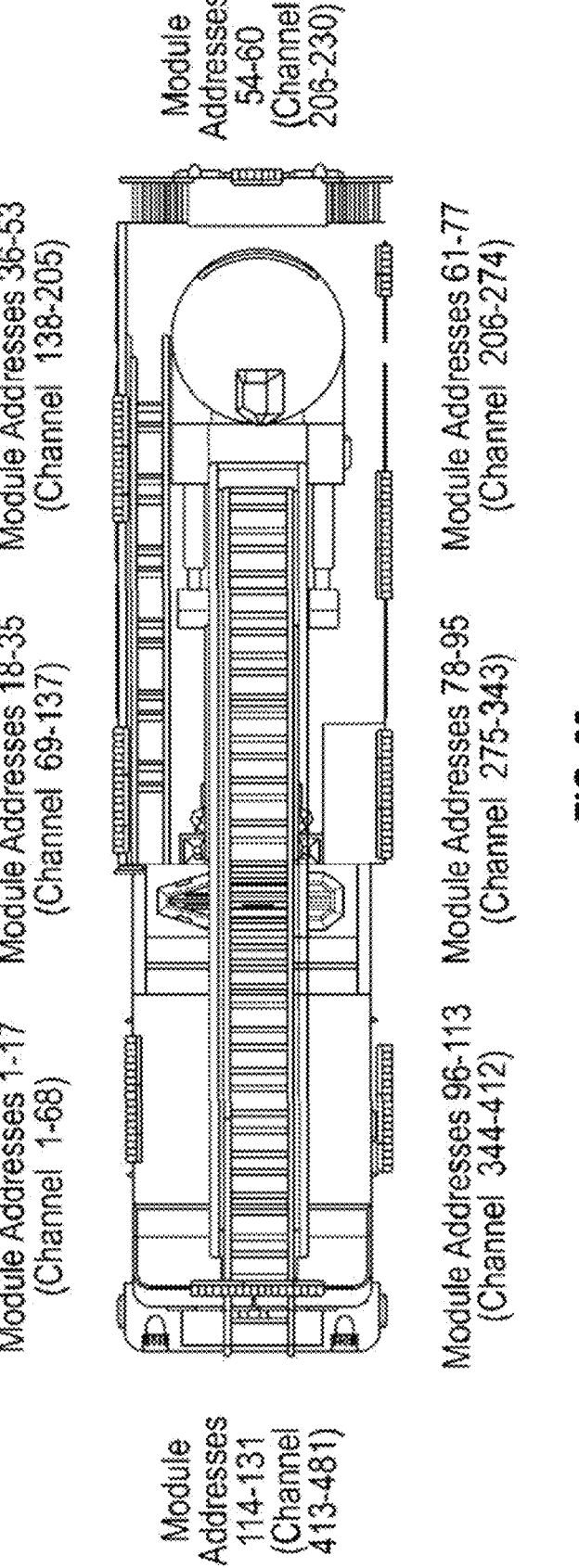
FIG. 25.—Overhead view illustrating a vehicle with mounting rails and modules installed along the front, left, right and rear edges of the vehicle.
Figure 26:
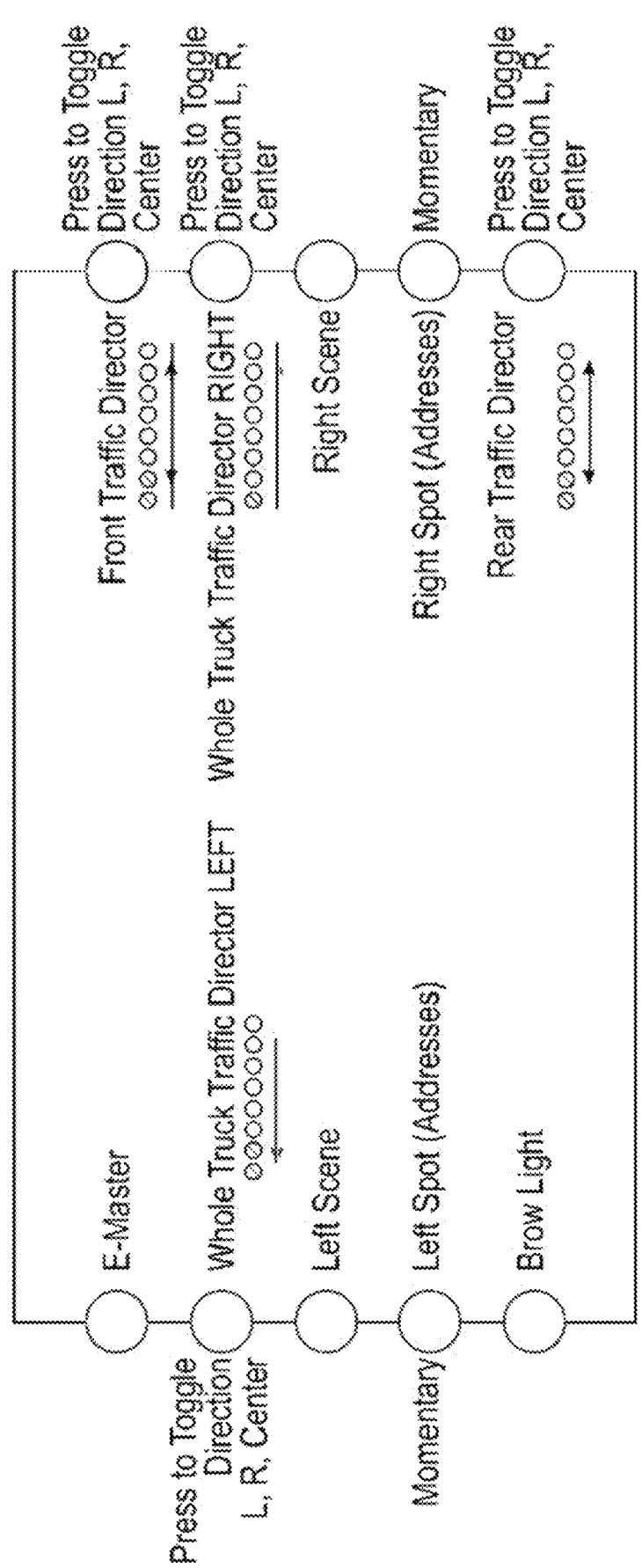
FIG. 26.—Lighting system control panel.
Figure 27:
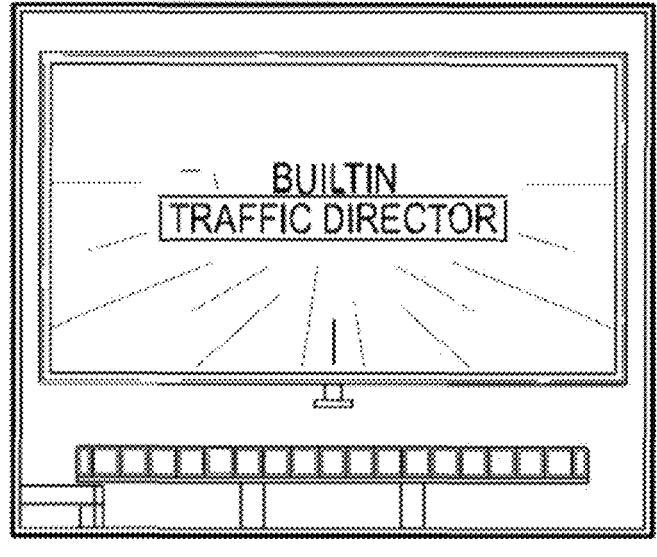
FIG. 27.—Images demo from video showing traffic director demonstration video.
Figure 27:
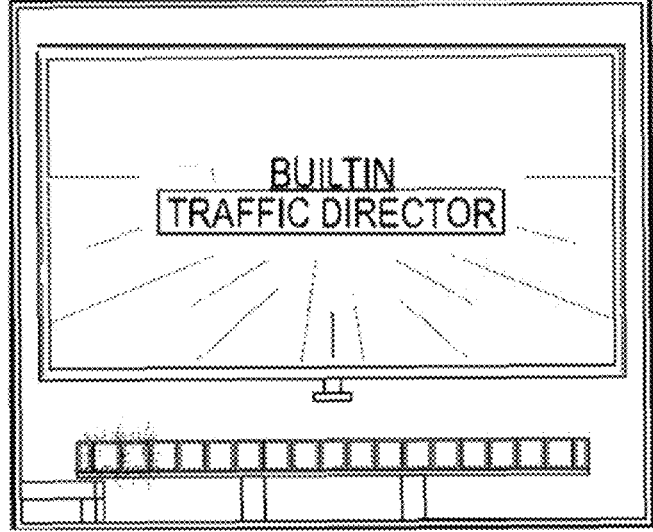
Figure 27:
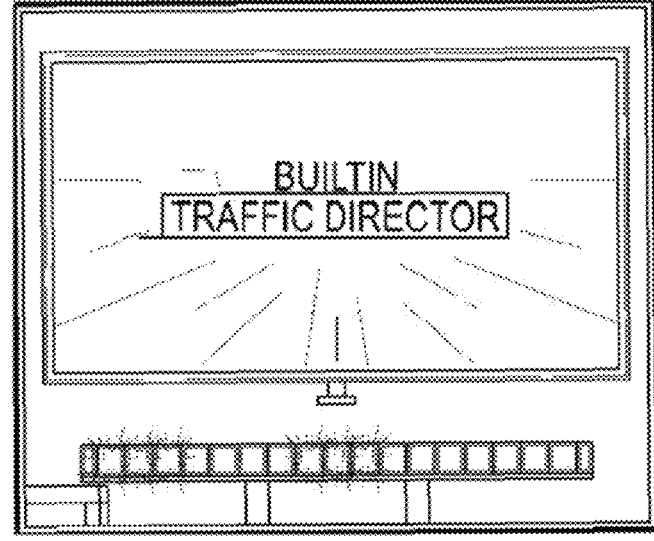
Figure 27:
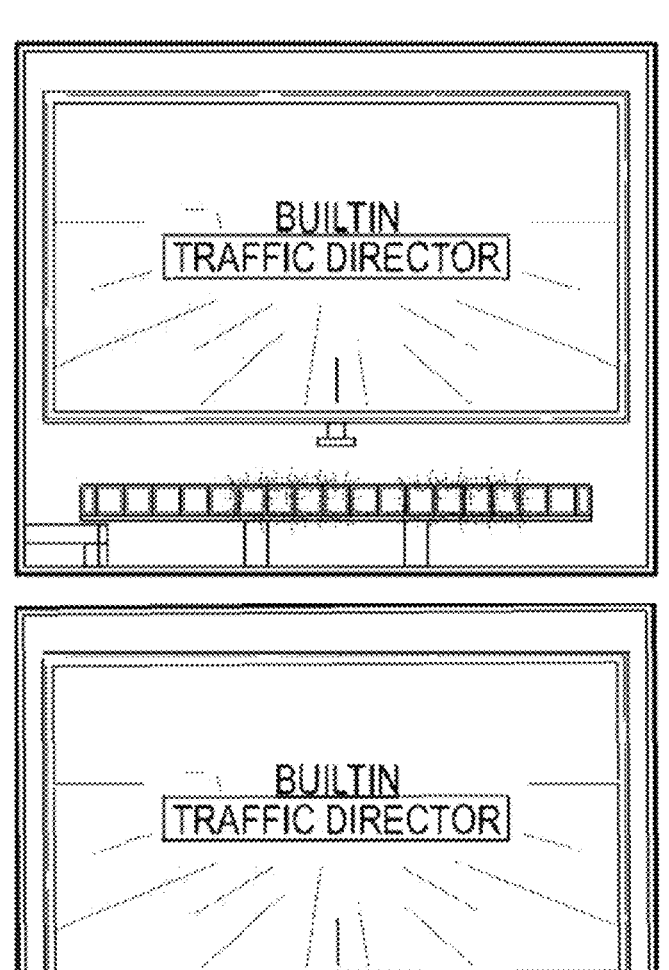
Figure 27:
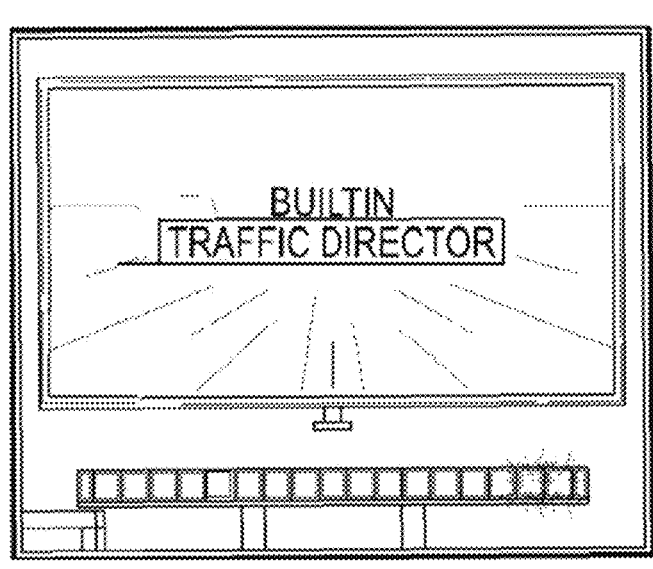
Figure 28:
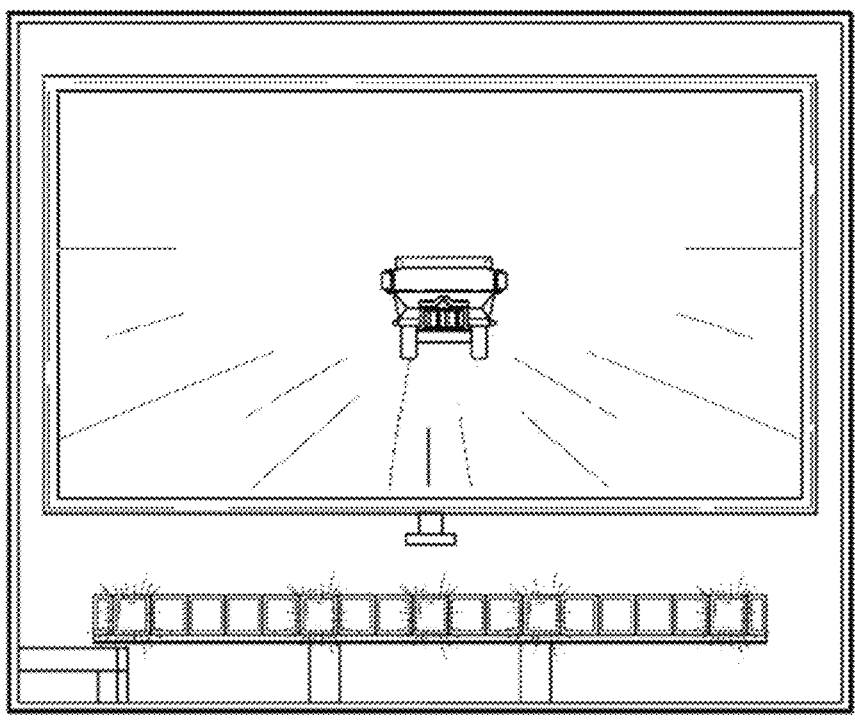
FIG. 28.—Image demo from video showing marker light mode.
Figure 29:
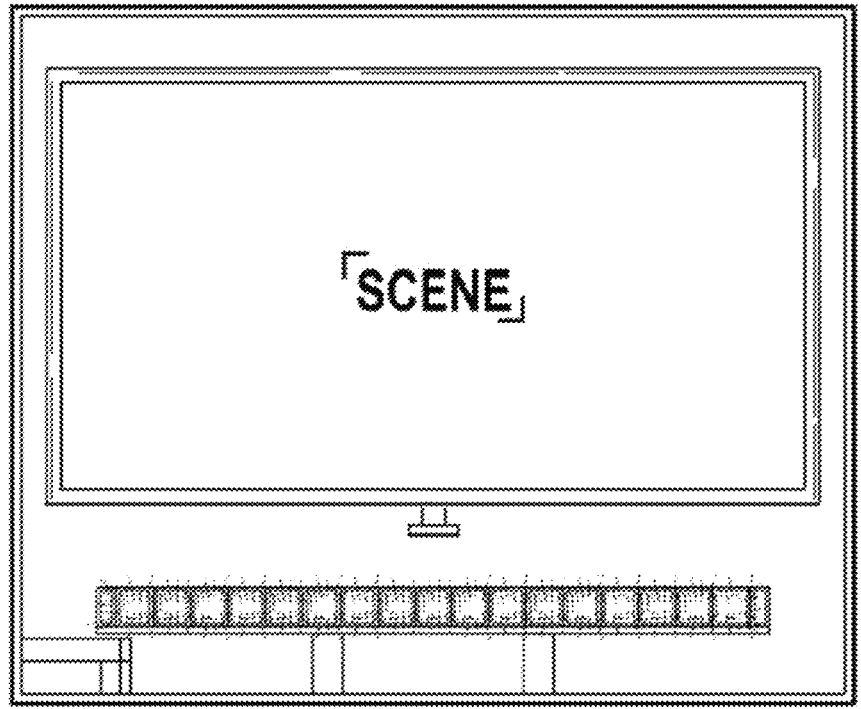
FIG. 29.—Image demo from video showing scene light channel for all modules.
Figure 30:
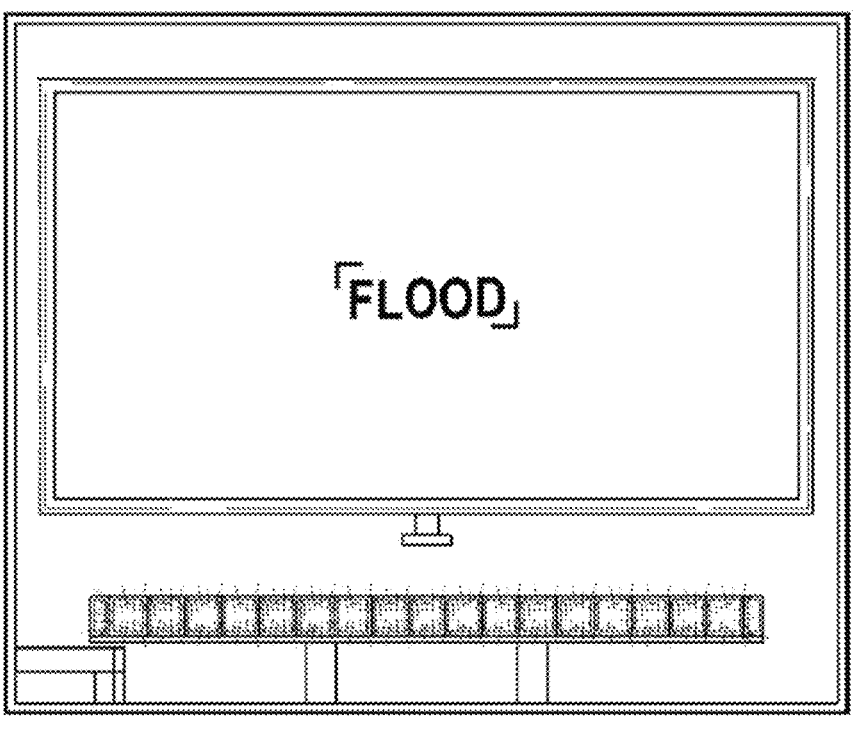
FIG. 30.—Image demo from video showing flood light channel for all modules.
Figure 31:
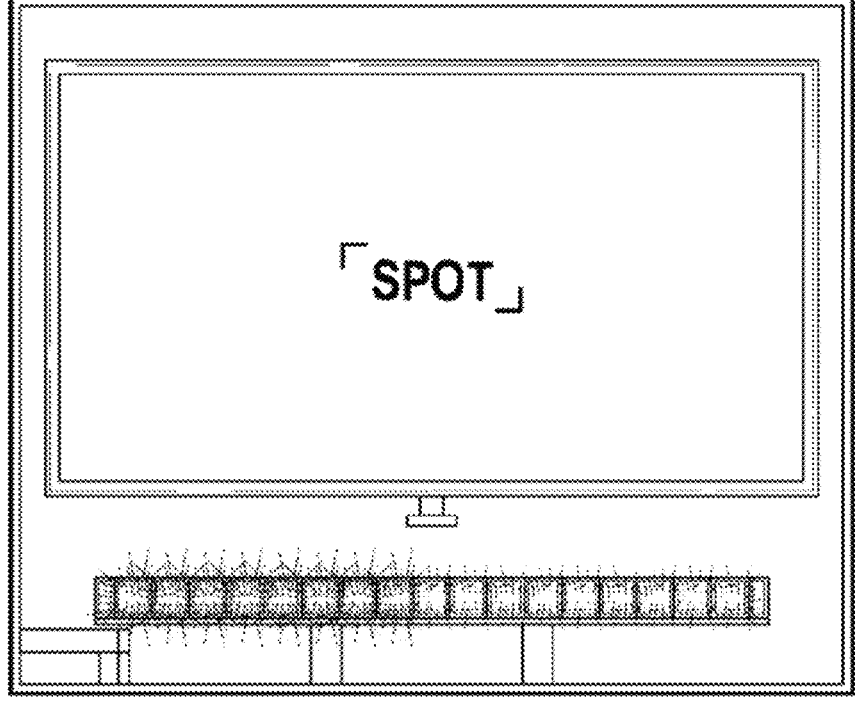
FIG. 31.—Image from demo video showing spot light channel for left most modules.
Figure 32:
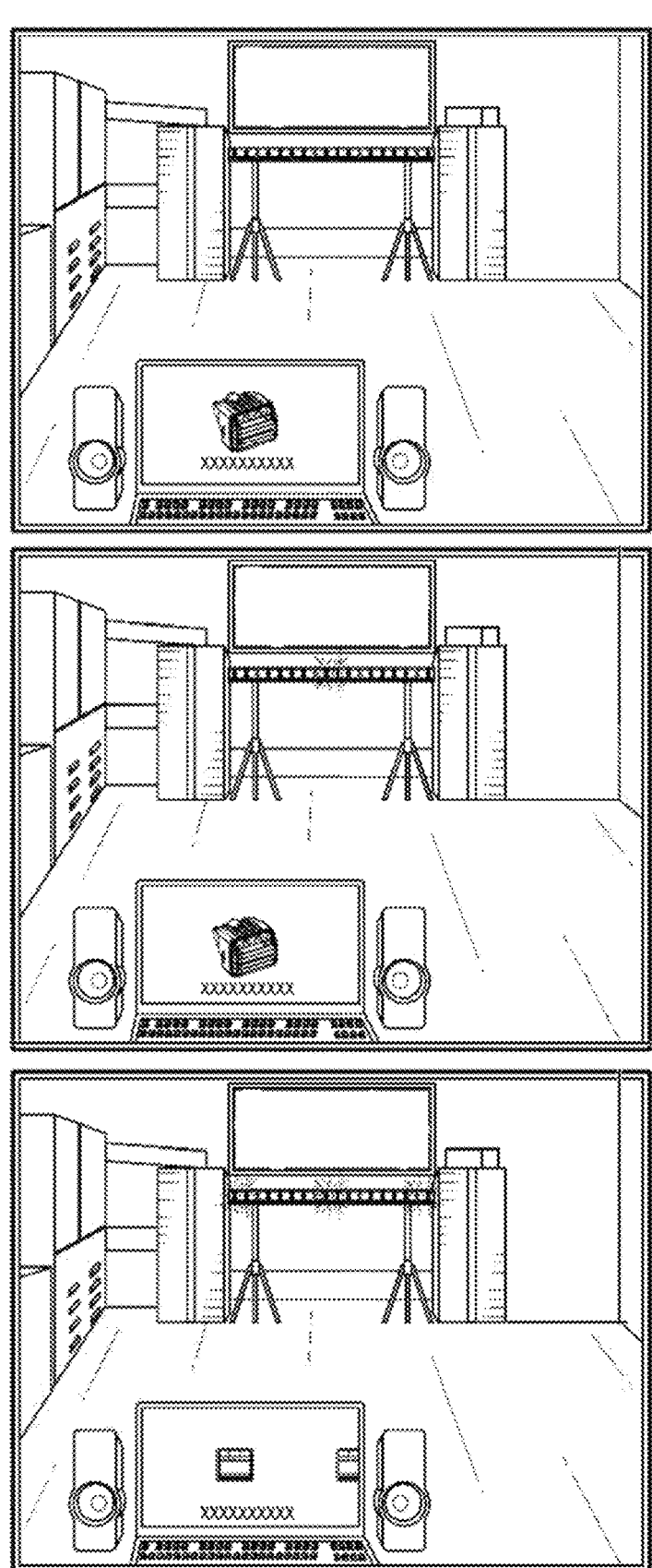
FIG. 32.—Image from test video showing illumination system controlled over Wi-Fi.
Figure 32:
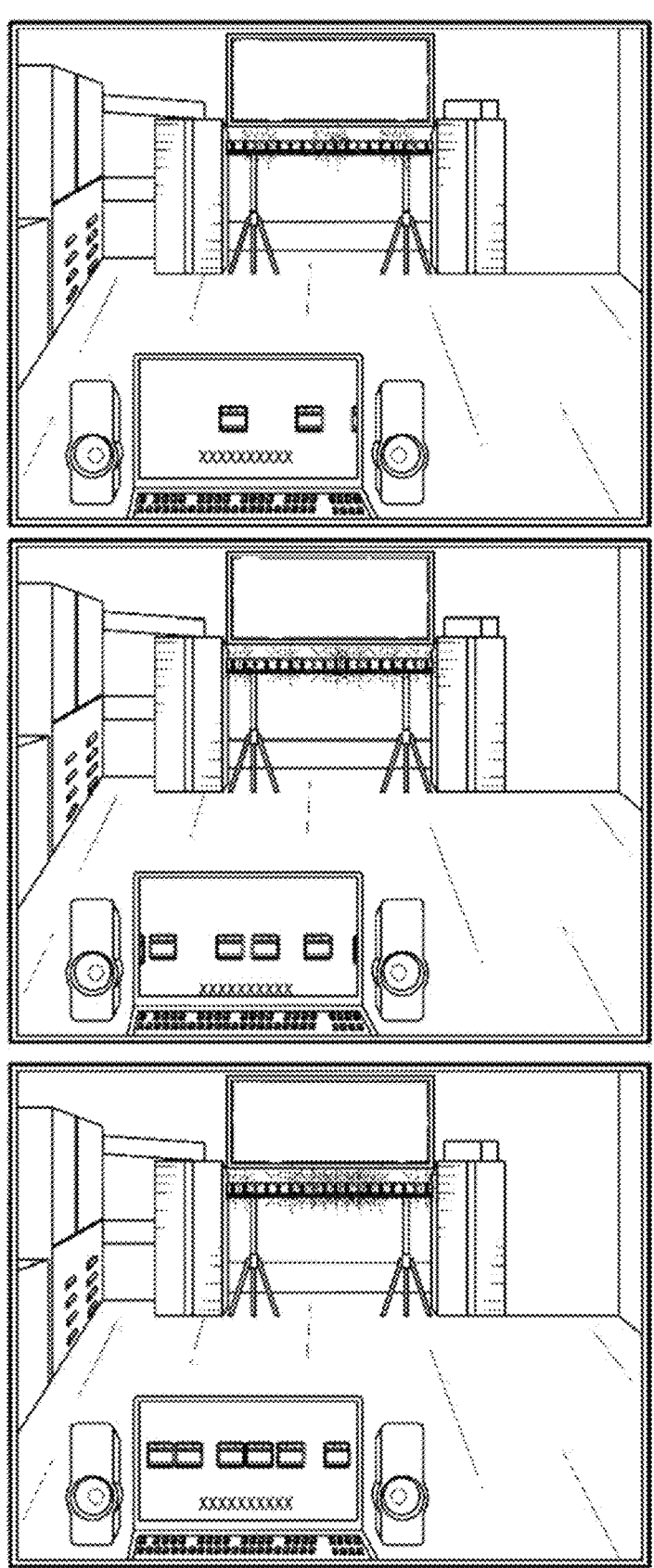
Figure 33:
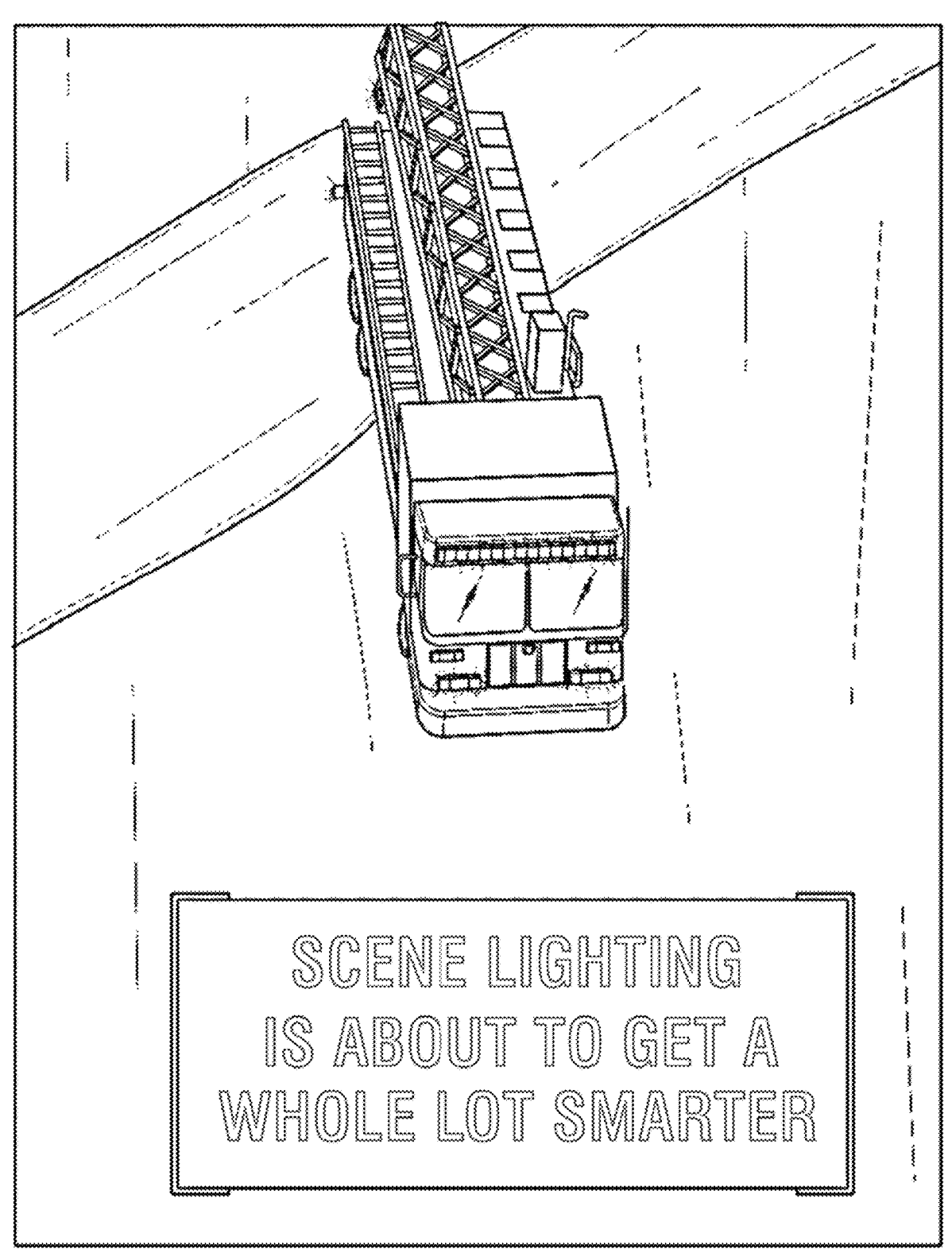
FIG. 33—A page from upcoming catalog.
Figure 34:
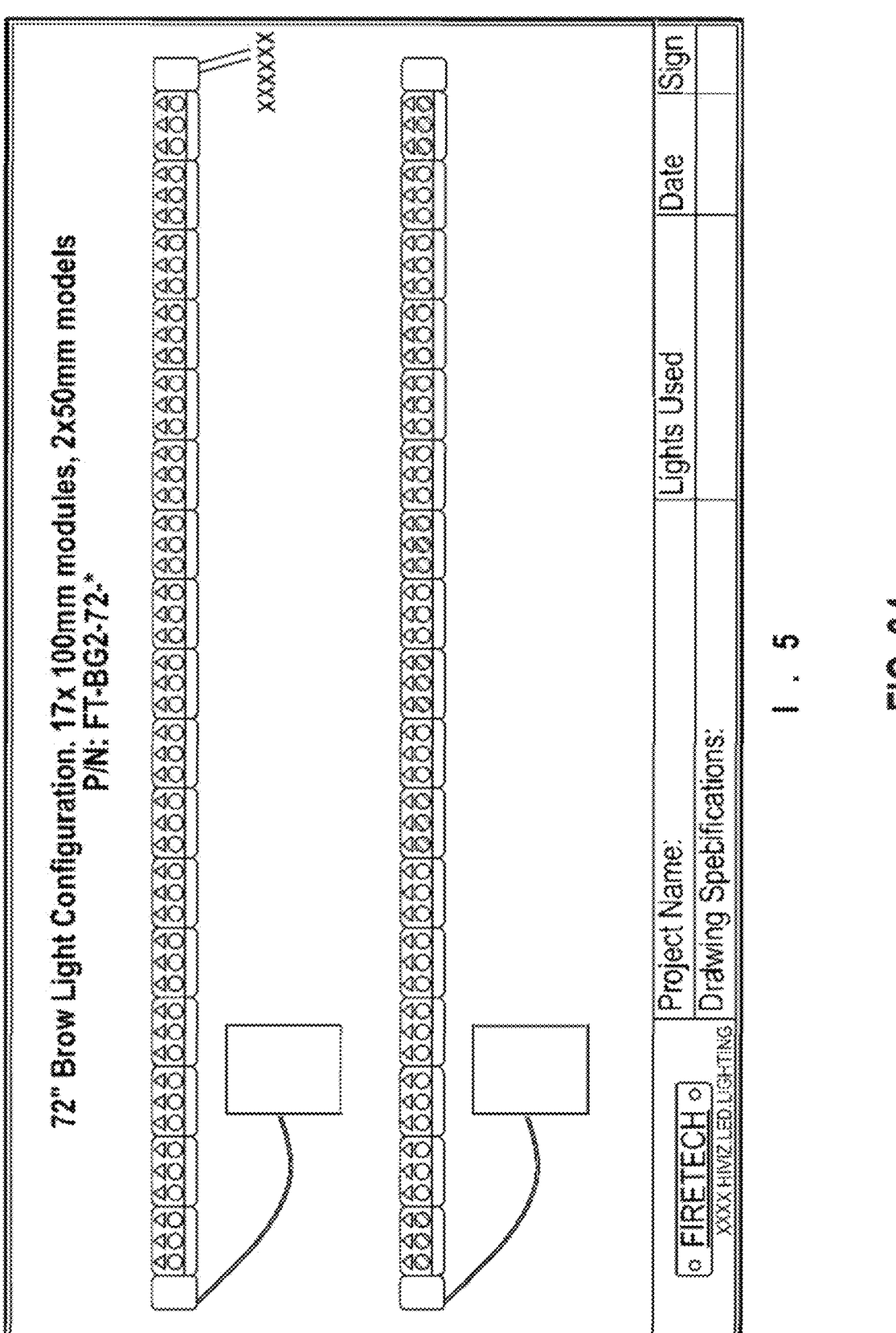
FIG. 34—Diagram showing an example of possible vehicle to system wiring.
Figure 35:
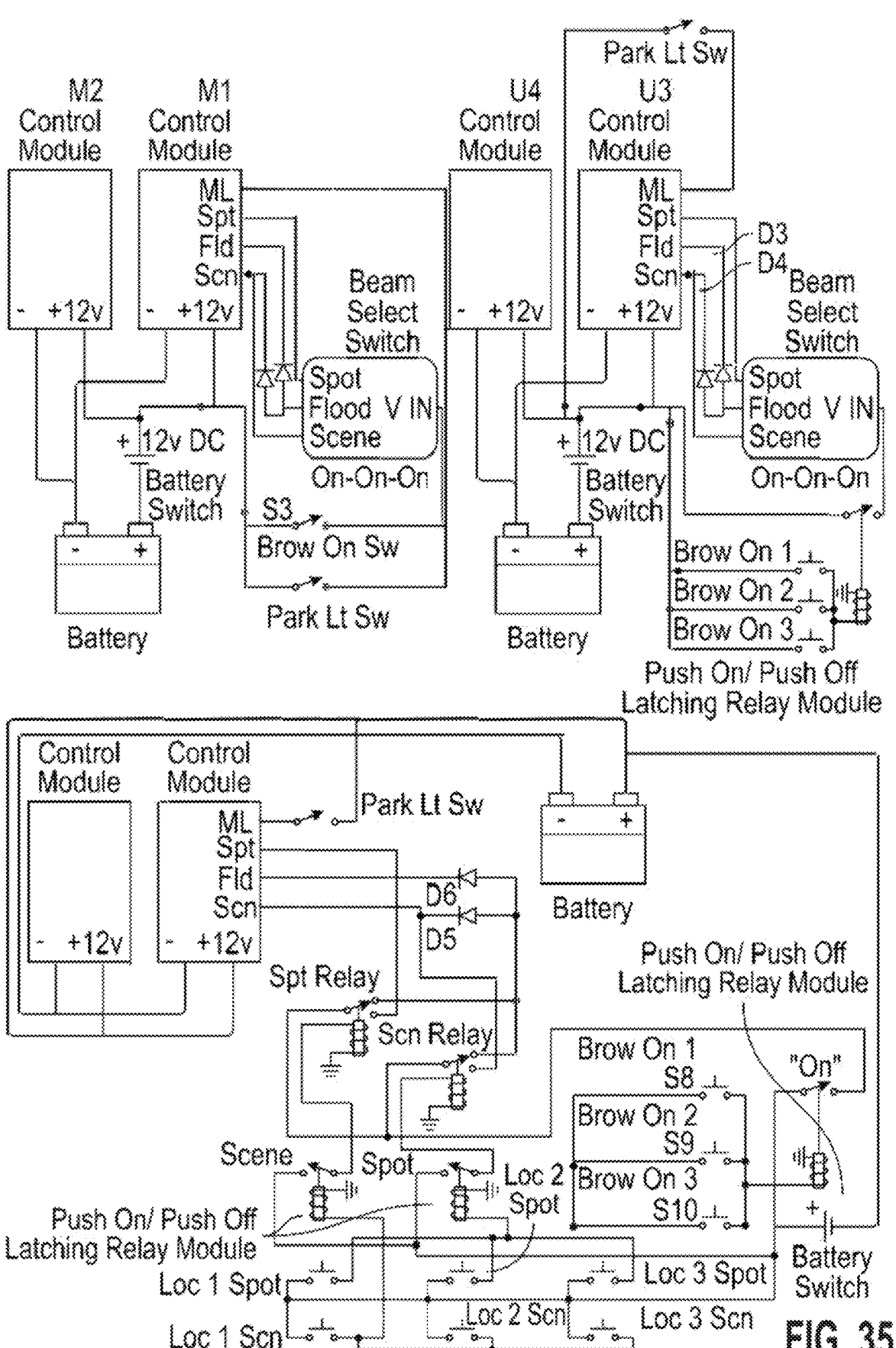
FIG. 35—Some examples of possible vehicle to system connections.
Figure 36:
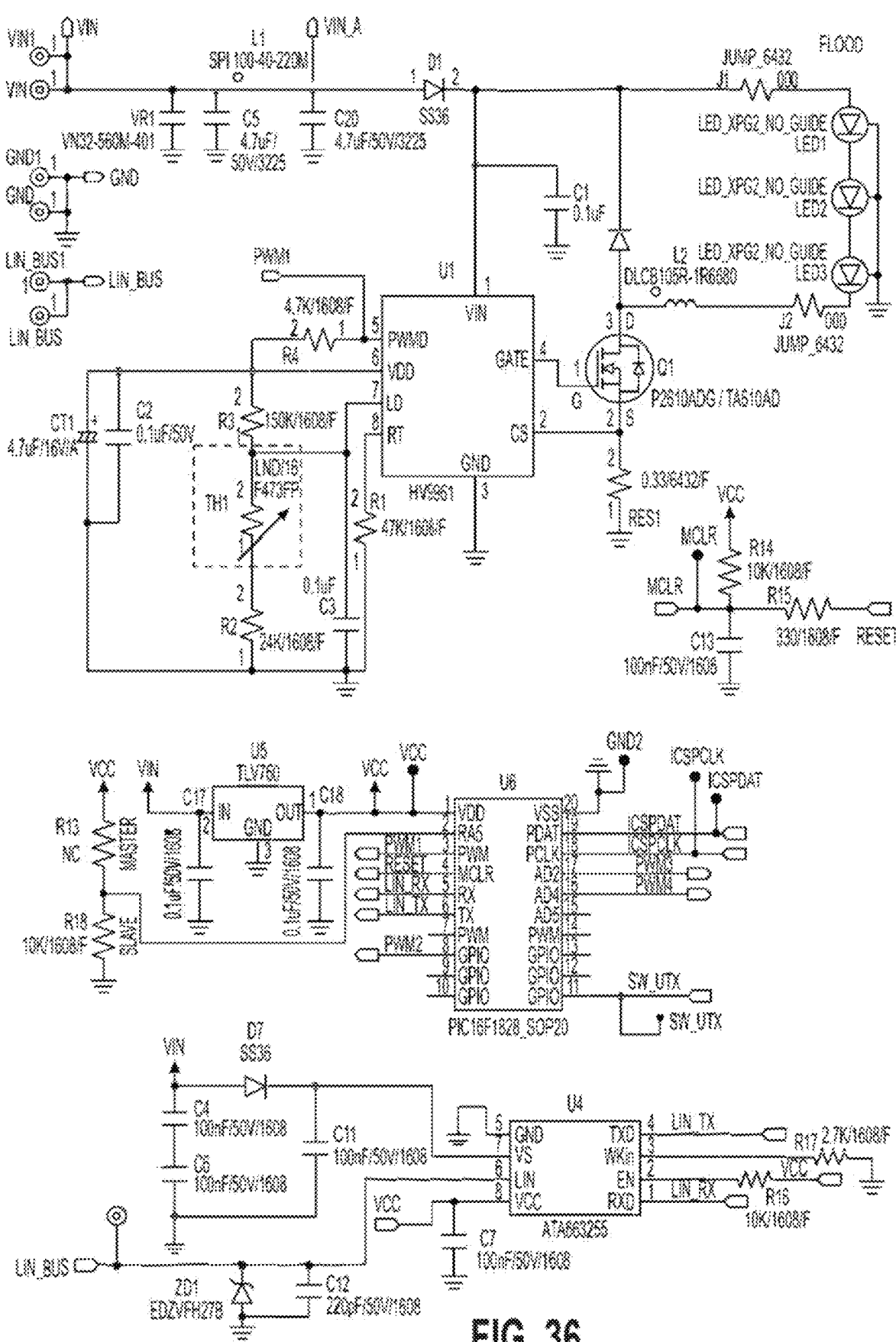
FIG. 36—One schematic page for one possible embodiment of an illumination module.
Figure 37:
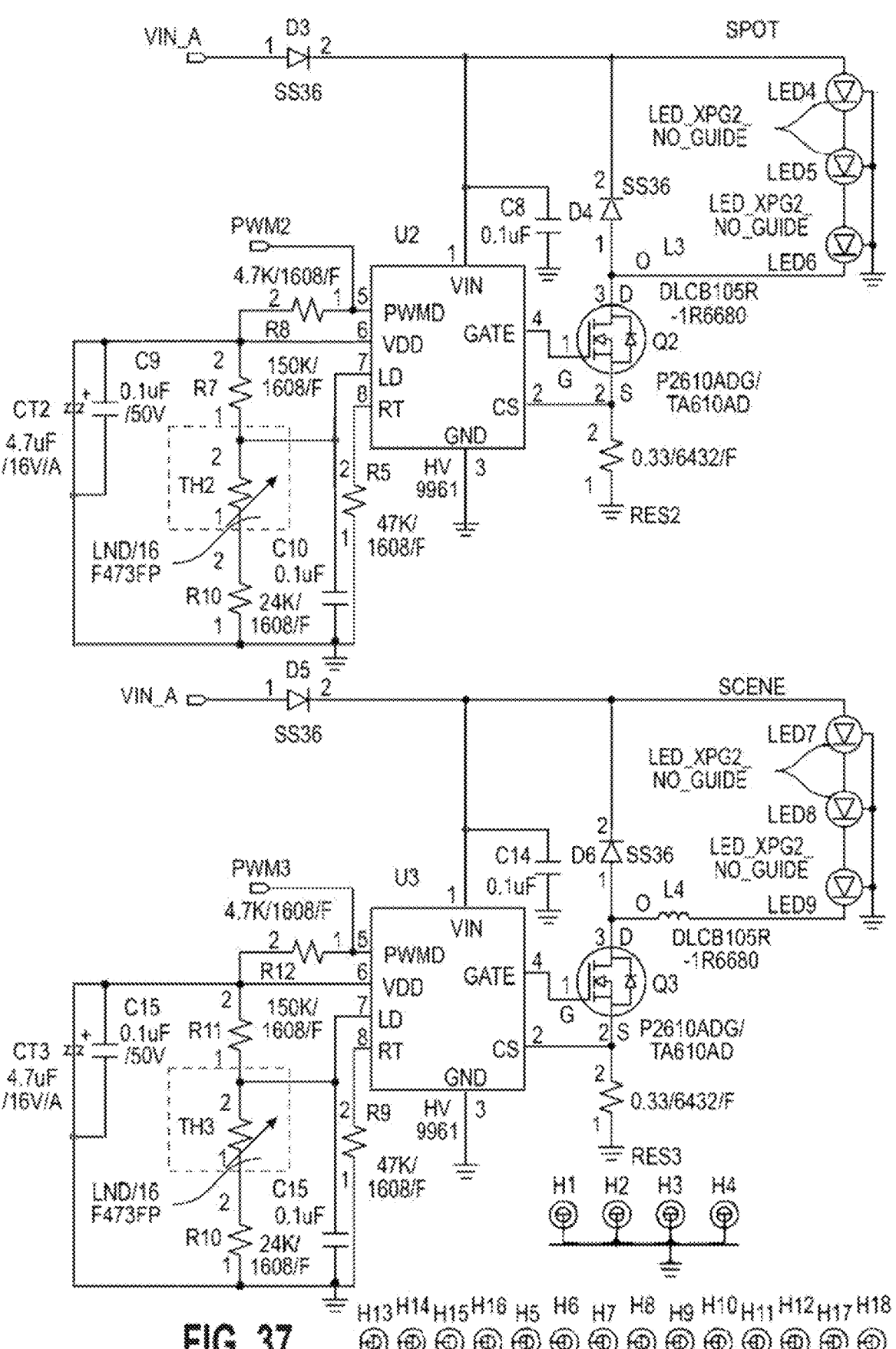
FIG. 37—Another schematic page for a possible embodiment of an illumination module.
Figure 38:
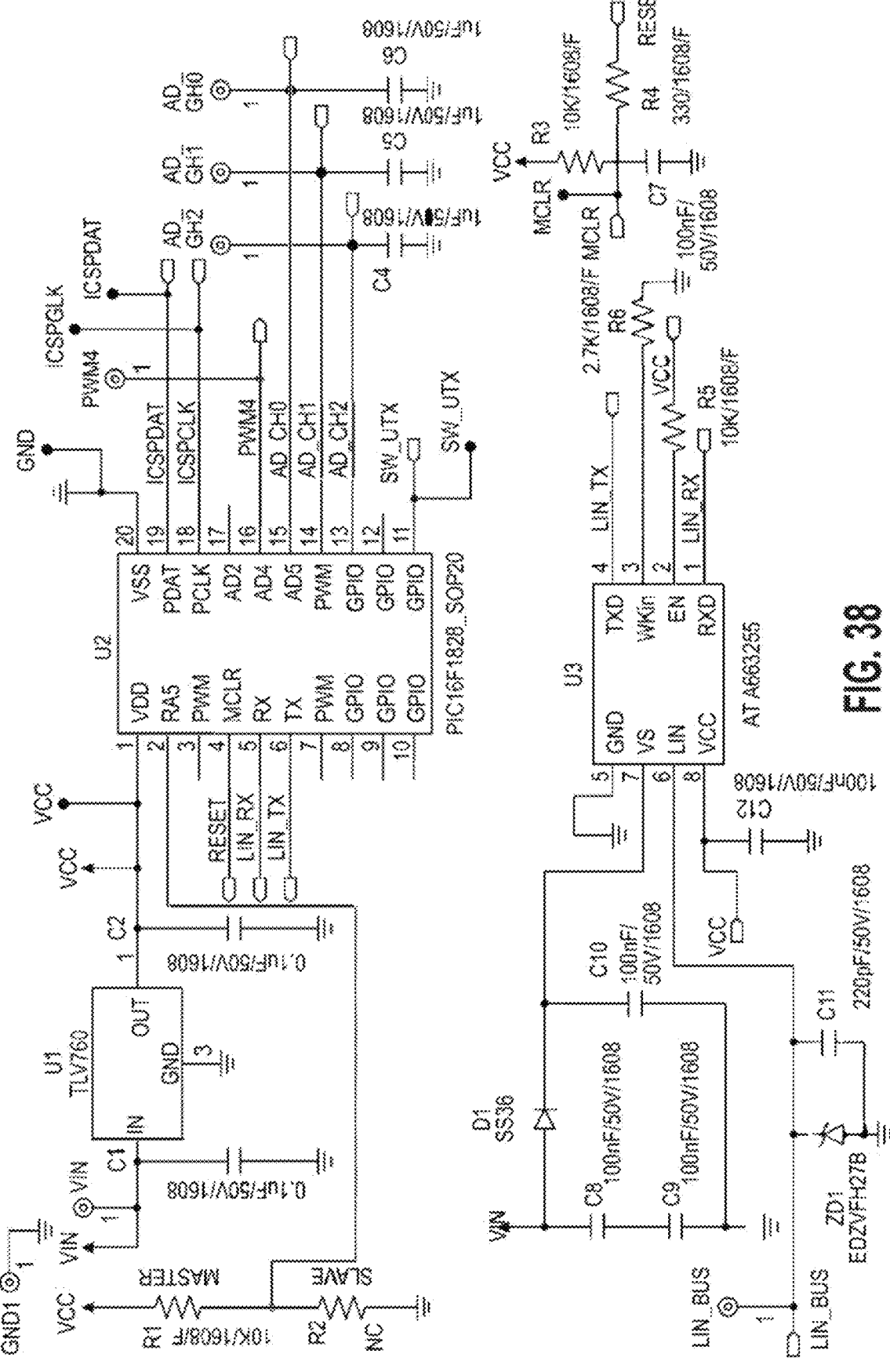
FIG. 38—Another schematic page for a possible embodiment of an illumination module.
Figure 39:
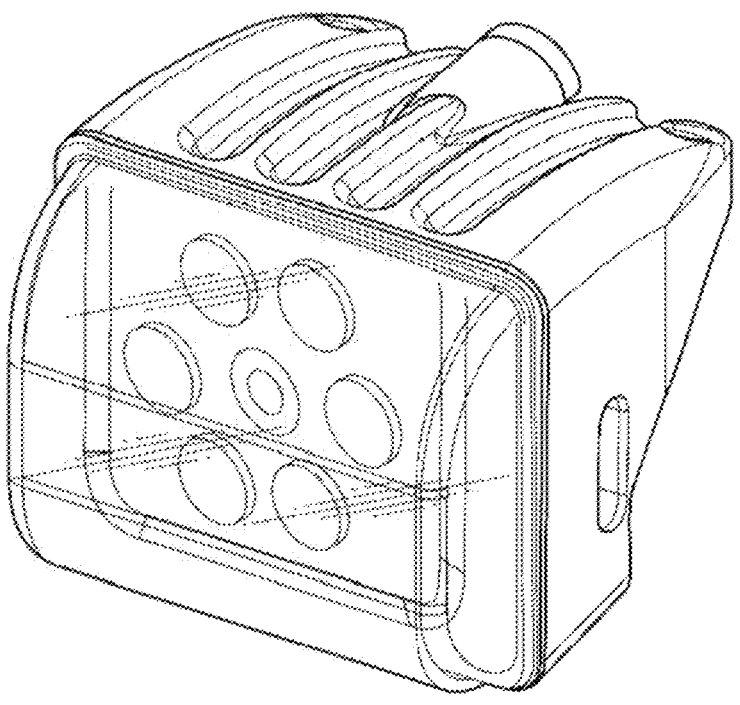
FIG. 39—An example accessory module embodiment featuring a combination camera and LED lighting accessory module.
Figure 39:
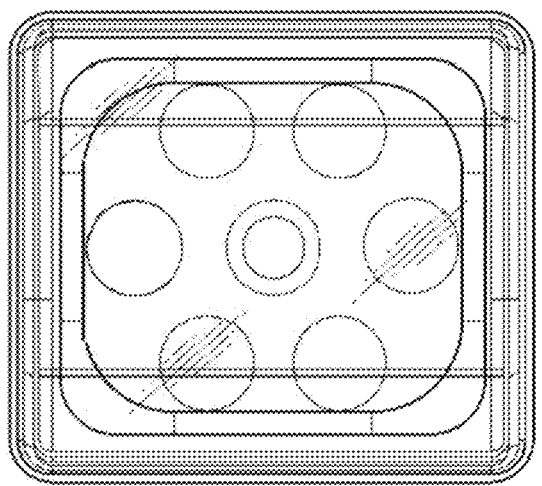
Figure 40:
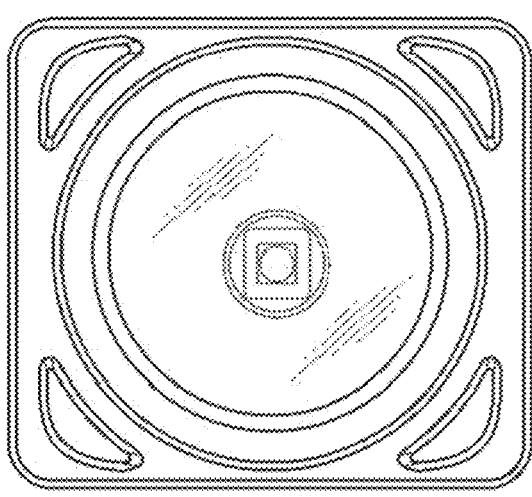
FIG. 40—An example accessory module embodiment of featuring a single high output LED module.
Figure 41:
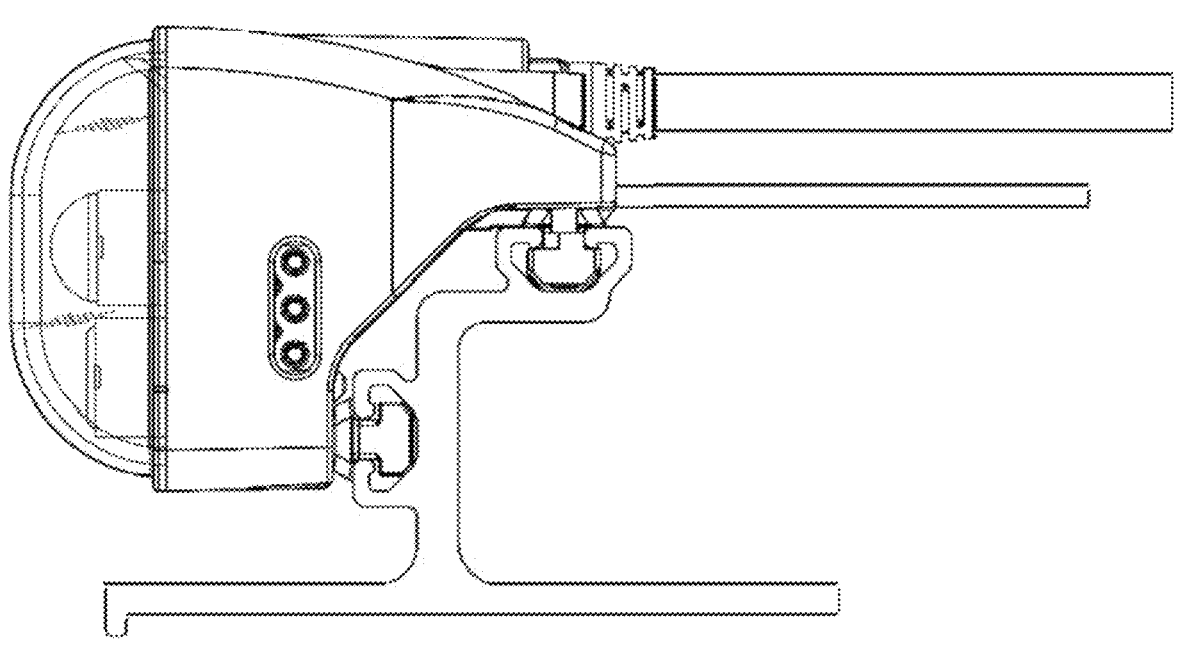
FIG. 41—An example accessory module embodiment of a communications module mounted on a 90 Degree T-rail.

The present disclosure is directed to a Vehicle Modular Accessory Mounting System.

In its most complete version, the vehicle auxiliary accessory mounting system is made up of the following components: multiple extruded rails featuring longitudinal mounting T-slots along their length, each rail having a cross-section designed to fit the mounting edge contour of the service vehicle mounting location with a length and curvature along the length to match desired installation edge of the service vehicle with rails mounted above the window line of the vehicle, rails mounted along the top edge along the sides of the vehicle, rails mounted along the top edge of the back of the vehicle, rails mounted along the vertical edges at the rear of the vehicle and rails mounted on poles lights that may be elevated or mounted or supported or elevated external from the vehicle; each rail equipped with multiple addressable accessory modules, that may include illumination modules featuring multiple output channels including a color output channel; with each rail having at least one communications module with large arrays of accessory modules having a second module at the end opposite the communication module to provide additional power for the accessory modules. These components are combined together to create an architecture for the vehicle modular accessory mounting system that wraps the service vehicle in addressable accessory modules, which may include illumination modules that can be elevated, providing a complete lighting solution that can be configured to deliver exactly the amount of light required in any direction around the vehicle. It should further be noted that this configuration not only allows light to be directed only in the direction and distribution pattern desired, preventing undesired glare and associated safety concerns but can also be used for generating traffic management light patterns and the entire system can be reconfigured during use to change not only the illumination patterns but can rotate the illumination and traffic management patterns around the vehicle, allowing quick and easy customization of the illumination system output as the site needs evolve without requiring the vehicle to be moved.

FIG. #1 shows the components of the modular auxiliary illumination system. Element 100 is one embodiment of an accessory module, an illumination module, and shows the module housing 110, the T-Slot retention tabs 119, the protective cover 120 for the LEDs and optics, along with connection pins 350 that provide at least two pins for module power and may provide additional pins for communication connections to the module and may carry digital signals between the accessory module and the communications module 360. The communications module 360, also referred to interchangeably as a control module in this document, connects to the vehicle via 361 power cables and communications cables 363. The communication module can respond to and generate vehicle voltage logic signals on one or more conductors in the communications cable 363 to establish desired operating modes and to communicate system status to the vehicle. Additionally, the communications module 360 may also communicate with vehicle or on-scene control via a wireless interface (not shown in FIG. #1), which may include, but is not limited to LTE, Wi-Fi, Bluetooth. The communications module 360 serves as a bridge between the vehicle communication system, which may use wired and or wireless protocols including, but not limited to, CAN, LIN, FlexRay, MOST, DC-BUS, IEBUS, J1850, ISO 9141-17-2, D2b, VAN, 12C, SPI, or RS-485. The communications module 360 may also communicate with other system modules, for example illumination or sensor modules, using one aforementioned communication protocols. The communication module 360 and illumination modules 100 mount to an extruded rail 200 with slots 210 to receive T-Slot retention tabs 119. The extruded rail 200 attaches to the edge of the vehicle using methods including but not limited to, screws, bolts, welding, tape or adhesives (not shown in FIG. #1) connect the rail 200 to the vehicle in two planes. The cross-section of the mounting rail 200 is designed to match the edge profile of the installation vehicle. Along its length the mounting rail 200 is either straight or curved to match the curvature of the installation edge, a vehicle cab roofline for example. The combination of edge mounting and attachment in two planes provides a strong, rigid connection to the vehicle, providing an ideal mounting location for other vehicle accessories.

FIG. #2 shows front and rear views of one embodiment of an illumination module 100. The housing 110 serves both protection and heat conduction roles. The housing 110 features pin passage ports 115 on the left and right side of the module for access to the pin interconnect assembly 300. Note that unused pin passage ports 115 are sealed with waterproof plugs at installation. The module features a waterproof vent 117 and heatsink fins 118. T-Slot retention tabs 119 and 119*a* mate with receiving slots the mounting rail (not shown in FIG. #2) with 119*a* providing a locking function to secure the module in place on the rail. A clear cover 120 protects the optics and LEDs from impact and weather.

FIG. #3 shows an exploded front view of one embodiment of an illumination module. The housing 110 includes a groove 111 for a gasket to seal the clear cover 120 to the housing 110. A heatsink 112, 112*a* and 112*b* conducts heat away from the LEDs, top channel LEDs 1310 shown. A wire passage 113 allows wiring to pass from the optical system printed circuit board 133 to the intermediary connection board 330. Connection ports 115 on the left and right side of the housing 110 provide access to the pin interconnect assembly 300.

Venting mechanism 117 prevents pressure buildup in the housing 110. T-Slot retention tabs 119 and 119*a* mate with receiving slots the mounting rail (not shown in FIG. #3), with 119a providing a locking function to secure the module in place on the rail. A clear cover 120 protects the optics and LEDs from impact and weather. The optical assembly 130 contains the optical system printed circuit board 133 containing the LED drivers (not shown in FIG. #3), communications transceiver (not shown in FIG. #3), the top channel LEDs 131c for the spot beam, the reflector optics 134 for a spot beam, the optics 135 for a scene beam, the flood and signal lighting optics 136, and heatsink 140. Also shown are the pin interconnect assembly 300 with rear cover 310, intermediary connection board 330 and rear cover sealing gasket 340. A male pin assembly 350 provides an electrical connection between the module's pin interconnection assembly 300 and a neighboring module's pin interconnection assembly 300.

FIG. #4 shows an exploded rear view of one embodiment of an illumination module. The module housing drawing shows a wiring passageway 113, a receiving block 114 for mounting the lower T-Slot retention tab 119 that will mate with a matching slot in the mounting rail (not shown in FIG. #4), pin passage ports 115 on the left and right side of the module to allow the pin connection assembly 350 to access to the module's pin interconnect assembly 300 to provide power and signal connections between modules, and heat dissipation fins 118. The optical assembly 130 shows the reflective optics 134 of the spot beam, the optical assembly electrical cable 137 and the heat sink 140 for the LEDs and LED drivers. Also shown are the protective cover 120 and the sealing area 121 of the protective cover.

FIG. #5 shows an exploded view of the optical assembly 130. Shown are the scene lighting LEDs 131a, the floodlight and signal LEDs 131b which include white LEDs and optional amber, red or RGB LEDs, the spotlight LEDs 131c, the reflective spotlight optics 134, the scene lighting optics 135, flood and signal lighting optics 136, and a heatsink 140.

FIG. #6 shows an exploded view illustrating the power and signal connections within an illumination module. The rear cover 310 provides a waterproof seal for the unit and holds the female receiver sockets 320 that connect power and signals to and from neighboring units. The female receiver sockets 320 are separated by insulated dividers 311 that hold the female receiver sockets 320 in the female pin retention area 312. Each female receiver socket, or socket, 320 has a hole 321 for receiving a male connector pin 350 and a slot 323 that sets the tension needed to ensure a reliable connection. The pin assembly 351 combined with the female receiver sockets 320 in each assessor module allow power to be passed between adjacent modules. The intermediary connection board 330 features a wire passageway 331 to allow a cable (not shown in FIG. #6) to pass that provides power and signal connections to the optical assembly printed circuit board (not shown in FIG. #6). Power and signal reach the connection board 330 via spring-loaded contact pins 333, with two pins per female receiver socket 320 for improved reliability and power handling. A rear cover sealing gasket 340 provides a waterproof connection between the rear cover 310 and the module housing (not shown in FIG. #6), and provides a waterproof seal 343 between the male connection pins 350 and the rear cover 310. Note that pin assembly 315 and receiver socket assembly 320 may be used in other numerical combinations, for example two conductors or four conductors (not shown in FIG. #6).

FIG. #7 Cross-sectional view of one embodiment of an illumination module. Shown are the module housing 110, the clear cover 120 protecting the optical system, including optical system printed circuit board 133, the scene lighting lens 135 and LEDs 131a, flood and signal lighting optics 136, the spotlight reflective optics 137 and heatsink 140 for the LEDs and drivers, as well as detail of the gasket edge 314 sealing the female receiver sockets 320, and the intermediary connection board 330, spring-loaded contacts 333, and rear cover sealing gasket 340.

FIG. #8. shows a profile view of a cross-section of one embodiment of an illumination module. This illustrates the structural relationship between the housing 110, the T-Slot retention tabs 119, and the clear protective cover 120. Also shown are the relationships between the optical system printed circuit board 133, scene lighting LED optics 135, flood and signal lighting optics 136, and heatsink 140 for the LEOs and drivers. The rear cover 310 houses the female receiver sockets 320 which connect to the intermediary connection board 330 via spring-loaded contacts 330. Additionally, the rear cover 330 seals to the housing 110 using a weatherproof sealing gasket 340.

FIG. #9 illustrates the novel way that the system ensures the maximum optical output of the system while providing maximum service life by automatically dividing a maximum 100% duty cycle between the system output channels of a module to limit the total thermal load on the available heat dissipation capacity of the system. Additionally, should ambient temperatures or localized thermal performance of specific LEDs cause the local heatsink temperature to exceed the designed operating temperature limits, each LED driver channel includes its own thermal feedback and ability to reduce the operating current to thermal protect the systems LEDs.

FIG. #10 shows multiple embodiments of the auxiliary illumination system extruded mounting rail illustrating how the rail is designed for installation along the edge defined where the planes of vehicle body panels meet. Shown are four cross-sectional profiles as well as examples of designs with both straight and curved linear rail sections. Note how the curved rail allows the system to conform to the curvature of a vehicle edge to simplify installations that would otherwise result in either a difficult installation or in compromise the optical performance of the system. Also note the profiles clearly illustrate the T-slot rails provided in two planes for mounting accessory modules.

FIG. #11 shows the profile and mounting detail for an extruded mounting rail with a radiused cross-section that is straight along its length. The rail features longitudinal mounting T-slots along the length to provide flexibility in selection of the number of accessory modules desired and the accessory module mounting locations. Note that the rail features two types of vehicle mounting points, holes for one plane and slots for the other, allowing the rail to connect to the vehicle in two planes, providing a secure connection to the target vehicle. Additionally, the slots allow flexible positioning of the rail prior to attachment via the hole.

FIG. #12. shows the profile and mounting detail for an extruded mounting rail with a 90 Degree Straight cross-section that is straight along its length. Note the mounting points, holes for one plane and slots for the other, allowing the rail to connect to the surface of two planes, providing a secure connection to the target vehicle.

FIG. #13 shows multiple units of one embodiment of the illumination modules installed on a 90 Degree Straight profile extruded mounting rail. Note that the endmost module would have a waterproof plug over the pin access port.

FIG. #14 shows multiple units of one embodiment of an illumination module and a communications module installed on a 90 Degree Straight mounting rail. Note here the communications module is mounted in the center of the mounting rail with accessory modules on both sides. This is possible because the modules feature electrical connection ports on both the left and right sides of the module.

FIG. #15 illustrates an example of a vehicle installation of the auxiliary illumination system. Here one can see how the T-Slot retention tabs engage with the T-slots in the mounting rail. Note the mounting rail profile is designed to conform to the radius of the mounting edge of the vehicle. Also, note that the illustration shows the end module with a waterproof vent to allow pressure equalization. Also shown are the power input cable to the end cap controller from the vehicle, the large wire at the top right of the module rear, and the communications wire located just below the power input cable. Note that some end cap module may provide power input only to ensure sufficient power is available to the accessory modules on the rail.

FIG. #16 illustrates a potential installation location of a system similar to that shown in FIG. #14 on a service vehicle.

FIG. #17 shows an example installation that includes two units of one embodiment of the communication module and eighteen units of one embodiment of the illumination modules, all mounted on a radiused extruded rail with extended top mounting flange. Note how the mounting rail is customized to fit the profile of the vehicle and the extended mounting tab allows the rail to reach a structural mounting location on the top plan of the installation side. Also, note that the mounting rail attaches to the vehicle in two different planes. Additionally, note that this installation features communications modules installed on both left and right end rail. The second communications module is providing only power to the accessory modules.

FIG. #18 shows details of one embodiment of an illumination module.

FIG. #19 show detail of another embodiment of an illumination module.

FIG. #20 shows an exploded view of one embodiment of an illumination module.

FIG. #21 shows detail related to the rear cover, female receiver sockets, gasket seals, male pin assembly and spring-loaded pin terminals connecting the female receiver sockets and intermediary connection board.

FIG. #22 shows an example installation of the auxiliary illumination system on two service vehicle roof profiles.

FIG. #23 shows an example installation of the disclosed auxiliary illumination system on truck-mounted pole lights. Note the pole lights may also be mounted and used off of the vehicle.

FIG. #24 Illustrates a service vehicle configuration that requires a low-profile lighting system.

FIG. #25. Overhead view illustrating a vehicle with mounting rails and modules installed along the front, left, right and rear edges of the vehicle. Note how the system can synchronize the module addresses to create a continuous set of individual modules surrounding the vehicle, each module with multiple channels, and each output channel of each module can be controlled independently.

FIG. #26.—Illustration of one possible embodiment of a system control panel for a vehicle with a system similar to that shown in Figure #25. The system control panel allows the accessory module operating modes to be configured as desired. For example, the system can illuminate the work site as needed on the sides of the vehicle facing the work site and the sides facing traffic can be set to display traffic signaling mode to direct traffic around the vehicle.

FIG. #27.—Images from a demonstration video showing the function and apparent motion of the color signal channel when operating in traffic signaling mode. Traffic signaling would be used on any side of the vehicle visible to traffic for reduced driver glare and improved visibility of the service vehicle to increase safety for both drivers and service personnel.

FIG. #28.—Image from demo video showing marker light mode. The modules configured as marker lights meet DOT requirements for vehicle marker lights. The channels of other models remain available to be configured as desired.

FIG. #29.—Image from a demo video showing scene light channel for all modules. Scene lighting is in a downward direction from the illumination module and provides lighting in the area immediately surrounding the vehicle. All light channels are available simultaneously but the color signal channel would be swamped in intensity by the flood light.

FIG. #30.—Image from a demo video showing flood light channel for all modules. Flood light is designed to provide working illumination of the vehicle work area. All light channels are available simultaneously but the color signal channel would be swamped in intensity by the flood light FIG. #31.—Image from a demo video showing the spotlight channel for leftmost modules. Spot mode focuses a high intensity light on more distant targets. All light channels are available simultaneously but the color signal channel would be swamped in intensity by the flood light FIG. #32.—Image from test video showing a vehicle modular accessory system configure as an auxiliary illumination system, with the system being controlled from a laptop via Wi-Fi. The laptop first turns on all white light channel of the center module, then turns on the white channels of the left most and right most lights and then moves the lights toward the center and adds another pair of outside. Note the lights are a low duty cycle to prevent overloading the camera exposure.

FIG. #33—A page from the upcoming product catalog describing the modular auxiliary illumination system.

FIG. #34—Diagram showing an example of possible vehicle to system wiring. Shown are signal wires from the vehicle that can be controlled via switches, relays or a control system to set voltage levels on the wires to the communication module that will set modes for the system that will be transmitted from the communications module to the illumination module.

FIG. #35—These diagrams show possible wiring connections between the vehicle and the communication or control module to signal to the system the desired lighting modes of the illumination modules.

FIG. #36—A schematic page for one possible embodiment of an illumination module. Note the channel designations associating each lighting function with an output channel of the illumination module. Note that an illumination module may include one or more channel outputs configuration and is not limited to only the possible embodiments shown here for reference. Also note that the microcontroller receiving communications from the communications or control module includes both receive and transmission lines supporting bidirectional data flow between the communications or control modules and the system accessory modules, in this case an illumination module.

FIG. #37—Another schematic page showing potential configurations for a possible embodiment of an illumination module.

FIG. #38—Yet another schematic page showing potential configurations for a possible embodiment of an illumination module.

FIG. #39—An example accessory module embodiment featuring a combination camera and LED lighting accessory module. The integrated LEDs lighting allow the module to provide illumination for the camera. The video feed can be viewed from a vehicle mounted remote display or be routed off of the vehicle via wireless networking for off vehicle monitoring.

FIG. #40—An example embodiment of an accessory module featuring a single high output LED module. This type of embodiment allows the selection of individual output power, color and light distribution on a module by module basis.

FIG. #41—An example embodiment of a communications module mounted on a 90 Degree Tee rail. Note that the T-rail references two planes with a flat bottom and a front lip.

ADDITIONAL INFORMATION

Industrial automobiles used as service vehicles, firetrucks for example, frequently require auxiliary lighting. Often it is desirable to mount auxiliary lighting on an edge of the vehicle, for example along the front edge of the vehicle where the windshield meets the roof of the cab, for best visibility. This mounting location is important but has been historically difficult to attach to.

Typically sheet metal cut brackets or aluminum castings have been attached to the bottom or sides of a single light fixture and attached near the front of the roof of the cab or near the edge of the vehicle body. Lights can be mounted with welded or bolted stanchions on the edge of the vehicle. Cast brackets can be used which attach to the bottom or sides of the light.

The embodiment examples described herein use a tooled extrusion bracket which on one side matches both the radiused edge profile and the contour of the vehicle's body. On the other side, the extrusion has a mating face to allow for installation of a light fixture or fixtures using captive hardware. This extrusion being an intermediary mounting rail allows for installation of various modular accessories along the edge of the vehicle body.

The benefit is that modules can be installed on the edge of the vehicle, while still being totally secured to the vehicle, and not being mounted in such a way that a shadow is cast. Functionally, you would attach the extruded bracket to the body, then slide the desired modules into the extrusion, then use the fixture.

The advantage of an intermediary rail is that the modules are then installed in a very low profile and streamlined way which allows secure attachment along the entire length of the vehicle body. It also allows for ease of service as once the rail is attached to the vehicle body, no longer is any sort of access required on the back side to add or remove the light fixture on the outside of the apparatus. The advantage of that is minimal down time, minimal warranty labor, and ease of service. Additionally, by tooling a bracket to attach to each style of cab, the mounting rail can be custom-fitted to each cab line a glove on a hand versus just bolting on a light in a universal way.

An extruded single piece brow light was introduced and became very popular. As the market adopted the technology, the optimal mounting location was realized to be ON THE EDGE of the cab. This was often not feasible because the cab is radiused, because there is some sort of duct work behind the edge of the cab, or because the apparatus manufacturer did not have the resources or available budget to design the bracket system. As a result, many fixtures that should have been placed on the "brow" of the cab ended up on the "roof" of the cab, which resulted in significant shadowing in front of the apparatus.

We found that the apparatus manufacturers just wanted to be able to bolt the light on, and be done with it. However, just "bolting on" was not easy with the existing tech, and by giving the apparatus manufacturer leeway for where the light is installed, it also gave them leeway to install the light incorrectly.

As the new brow light concept was formalizing, the thought was to extrude a single mounting bracket for each cab, and not give the apparatus manufacturer an option. If there is only one bracket that attaches to the specific cab, and it is cut to length and designed specifically to match the contour of that cab, it would be impossible to mess up, or at least difficult to not install correctly One sticking point was it is difficult to make an intermediary bracket that contours both vertically and horizontally. Some cabs are "bowed" and that curve requires the extrusion to be bent as well. Bending the rail caused the problem that one-piece extruded light modules would no longer fit on the rail.

The solution was to use multiple small modules attached to a long rail. This allows a rail to be custom fit to the vehicle for an easy, secure attachment to a vehicle in the ideal location. The rail then serves as a reliable, easy to use mounting location for accessory modules for the service life of the vehicle.

Most manufacturers in the past have used cast brackets or sheet metal brackets to accommodate the profile of the cab. The lights have historically all been a single module with two brackets attaching them to the cab.

Commercial extruded rails with lights to exist, but these are typically complete warning light bar assemblies, which are not interconnected, do not conform to the profile or curvature of the roof edge and attached directly to a single plane on the cab.

One point of innovation here is that a single bracket goes between the cab and the modules. Not an extrusion with a bunch of brackets hanging off of it, but the extruded bracket being the ONLY thing between the body and the modules.

Another legacy technology is a warning lightbar that attaches to the face of an ambulance box. This is not a contoured part that goes on the corner of the truck but rather a piece that attached on the vertical face. Upgrading or replacing the lightbar requires removing the screws from the surface and leaves holes that need to be sealed and rust-proofed unless the mounting pattern and screw sizes of the replacement lightbar matches exactly.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. Accordingly, it is to be understood that the embodiments of the invention herein described are merely illustrative of the application of the principles of the invention. Reference herein to details of the disclosed and illustrated embodiments is not intended to limit the scope of the claims, which themselves recite those features regarded as essential to the invention.

The embodiments of the invention in which an exclusive property or privilege is claimed are defined as follows:

1. A lighting system comprising: an attachment configured to conform with an edge of a vehicle; and at least one lighting module coupled to the attachment, wherein the at least one lighting module is one of a plurality of modules, and wherein each module of the plurality of modules is configured to electrically couple with an adjacent module of the plurality of modules, wherein each module of the plurality of modules is controlled independently, and wherein the plurality of modules is configured to produce a plurality of flashing patterns;

wherein the lighting system is mounted on the edge such that the vehicle does not obstruct an illumination path of the lighting system.

2. The lighting system of claim 1, wherein the attachment is an extrusion.

3. The lighting system of claim 1, wherein the edge of the vehicle comprises:

a first plane; and a second plane, wherein the first plane and the second plane meet.

4. The lighting system of claim 3, wherein the first plane is a top surface of a vehicle, and the second plane is an adjacent vertical surface of the vehicle.

5. The lighting system of claim 3, wherein the second plane is an area above a windshield of the vehicle.

6. The lighting system of claim 1, wherein the edge is a curved edge.

7. The lighting system of claim 6, wherein the attachment is a curved extrusion.

8. The lighting system of claim 1, wherein the lighting system further comprises an interface module configured to:

receive electrical power and/or communication signals from the vehicle; and transmit the electrical power and/or the communication signals to the plurality of lighting modules.

9. The lighting system of claim 1, wherein the lighting system is mounted on the edge such that the vehicle does not obstruct an illumination path of the lighting system.

10. A modular vehicle accessory mounting system comprising:

one or more extruded mounting rails designed to mount to an edge of a vehicle and reference more than one plane of the vehicle;

one or more accessory modules configured to couple with the one or more extruded mounting rails, each of the one or more accessory modules including sets of two or more conductive sockets on each side of the one or more accessory modules, wherein the two or more conductive sockets are configured to receive conductive pins to provide electrical connection between adjacent modules, wherein the one or more accessory modules includes a plurality of lighting modules, wherein each lighting module of the plurality of lighting modules is configured to electrically couple with an adjacent module of the plurality of lighting modules, wherein each lighting module of the plurality of lighting modules and each accessory module of the one or more accessory modules is controlled independently, and wherein the plurality of lighting modules is configured to produce a plurality of flashing patterns;

wherein the lighting modules are mounted on the edge such that the vehicle does not obstruct an illumination path of the lighting system; and an interface module for each extruded mounting rail of the one or more extruded mounting rails, comprising cables to receive electrical power from and communication signals from the vehicle, the interface module configured to distribute power and communicate to the one or more accessory modules via the conductive pins and sockets.

11. The modular vehicle accessory mounting system of claim 10, wherein the one or more extruded mounting rail comprises longitudinal mounting T-slots in more than one plane; and wherein the one or more accessories further comprise T-slot retention bolts configured to couple with the longitudinal mounting T-slots.

12. The modular vehicle accessory mounting system of claim 10, wherein the more than one plane is an edge of the vehicle.

13. The modular vehicle accessory mounting system of claim 12, wherein the edge is a curved edge.

14. A lighting module comprising:

one or more poles configured to couple with a vehicle;

one or more attachments, wherein each attachment of the one or more attachments is coupled with a pole of the one or more poles, and wherein the one or more attachments are one or more extrusions;

one or more lighting modules coupled with each attachment of the one or more attachments, wherein the one or more poles are configured to move the one or more attachments; and wherein the lighting modules are mounted on the edge such that the vehicle does not obstruct an illumination path of the lighting system.

15. The lighting module of claim 14, wherein the one or more poles are configured to raise and lower the one or more attachments.

16. The lighting module of claim 14, wherein the one or more lighting modules is a plurality of lighting modules, and wherein each lighting module of the plurality of lighting modules is configured to electrically couple with an adjacent module of the plurality of lighting modules.

17. The lighting module of claim 16, wherein the lighting module further comprises an interface module configured to:

receive electrical power and/or communication signals from the vehicle; and transmit the electrical power and/or the communication signals to the plurality of lighting modules.

18. The lighting system of claim 1, further comprising one or more external communication connections configured for communicating with an alert system.

19. The lighting system of claim 1, wherein the plurality of flashing patterns includes a traffic directing pattern, a high visibility alert pattern, status pattern, indicator pattern, or a combination thereof.

20. The lighting system of claim 1, wherein the plurality of modules includes laser outputs with a single beam, multiple beams or grid patterns in the visible and or infrared spectrums, ultraviolet (UV) or infrared (IR) light sources, radio frequency (RF) emitters, audible output emitters, or a combination thereof.

* * * * *